United States Patent
Rousso et al.

(10) Patent No.: US 9,493,302 B2
(45) Date of Patent: Nov. 15, 2016

(54) WASTE DISPOSAL SERVICES AND METHODS

(71) Applicant: Edgewell Personal Care Brands, LLC, Chesterfield, MO (US)

(72) Inventors: John Rousso, Trumbull, CT (US); Steve Mowers, Fairfield, CT (US); (Continued)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 134 days.

(21) Appl. No.: 14/073,151

(22) Filed: Nov. 6, 2013

(65) Prior Publication Data

US 2015/0122819 A1    May 7, 2015

Related U.S. Application Data

(63) Continuation of application No. 12/080,178, filed on Apr. 1, 2008, now Pat. No. 8,613,371, which is a (Continued)

(51) Int. Cl.
*B65F 1/06* (2006.01)
*B29C 65/00* (2006.01)
(Continued)

(52) U.S. Cl.
CPC ............ *B65F 1/06* (2013.01); *B29C 66/1122* (2013.01); *B29C 66/4312* (2013.01); (Continued)

(58) Field of Classification Search
CPC ............ B65F 1/06; B65F 1/062; B65F 1/163; B65F 2210/167; B65F 2240/132; (Continued)

(56) References Cited

U.S. PATENT DOCUMENTS 2,811,329 A    10/1957   Press
4,785,964 A    11/1988   Miller
(Continued)

FOREIGN PATENT DOCUMENTS

JP    03-9302       1/1991
JP    06-056004     1/1994
(Continued)

OTHER PUBLICATIONS

Examination Report dated Jan. 22, 2013 from Canadian Application. No. 2705794.
(Continued)

*Primary Examiner* — Fenn Mathew
*Assistant Examiner* — Elizabeth Volz
(74) *Attorney, Agent, or Firm* — Edgewell Personal Care Brands, LLC

(57) ABSTRACT

Waste disposal devices and methods are provided. The device includes a housing, a lid, a bucket frame, a pair of members, and a foot pedal. The foot pedal is operatively associated with the lid and the pair of members so that the lid is in the closed position and the pair of members is in the non-use position when the foot pedal is in the upper position. Further, the foot pedal is operatively associated with the lid and the pair of members so that the lid is in the open position and the pair of members is in the use position when the foot pedal is in the lower position.

11 Claims, 26 Drawing Sheets

(72) Inventors: John Cichello, Wooster, OH (US);
Rick Corney, Akron, OH (US);
Michael Jackson, Wooster, OH (US);
Vincent Valderrama, Stamford, CT (US)

Related U.S. Application Data continuation-in-part of application No. 11/985,734, filed on Nov. 16, 2007, now abandoned.

(51) Int. Cl.
*B65B 67/12* (2006.01)
*B65F 1/14* (2006.01)
*B65F 1/00* (2006.01)
*B29C 65/18* (2006.01)

(52) U.S. Cl.
CPC ....... *B29C 66/8221* (2013.01); *B29C 66/8227* (2013.01); *B29C 66/83241* (2013.01); *B29C 66/849* (2013.01); *B65B 67/1211* (2013.01); *B65B 67/1277* (2013.01); *B65F 1/0006* (2013.01); *B65F 1/062* (2013.01); *B65F 1/163* (2013.01); *B29C 65/18* (2013.01); *B65F 2210/167* (2013.01); *B65F 2240/132* (2013.01)

(58) Field of Classification Search
CPC ............... B65F 1/0006; B65D 43/26; B65D 25/14; B29C 65/18; B29C 66/1122; B29C 66/8227; B29C 66/4312; B29C 66/83241; B29C 66/849; B29C 66/8221
USPC .......... 220/263, 495.01, 495.06, 908, 908.1, 220/264, 495.07
See application file for complete search history.

(56) References Cited

U.S. PATENT DOCUMENTS

| | | |
|---|---|---|
| 4,869,049 A | 9/1989 | Richards |
| 4,913,308 A | 4/1990 | Culbertson |
| 4,972,966 A | 11/1990 | Craft |
| D319,905 S | 9/1991 | Hotchkiss |
| 5,125,526 A | 6/1992 | Sumanis |
| 5,147,055 A | 9/1992 | Samson |
| 5,249,693 A | 10/1993 | Gillispie |
| 5,322,225 A | 6/1994 | Cina |
| 5,348,222 A | 9/1994 | Patey |
| 2,429,311 A | 7/1995 | Cina |
| D368,563 S | 4/1996 | Brightbill |
| 5,535,913 A | 7/1996 | Asbach |
| 5,590,512 A | 1/1997 | Richards |
| 5,655,680 A | 8/1997 | Asbach |
| 5,662,758 A | 9/1997 | Hamilton |
| 5,813,200 A | 9/1998 | Jacoby |
| 5,960,710 A | 10/1999 | Holtom |
| 5,965,235 A | 10/1999 | McGuire |
| 6,128,890 A | 10/2000 | Firth |
| 6,170,240 B1 | 1/2001 | Jacoby |
| 6,194,062 B1 | 2/2001 | Hamilton |
| 6,370,847 B1 | 4/2002 | Jensen |
| 6,489,022 B1 | 12/2002 | Hamilton |
| D468,507 S | 1/2003 | McGee |
| 6,516,588 B2 | 2/2003 | Jensen |
| 6,612,099 B2 | 9/2003 | Stravitz |
| 6,626,316 B2 | 9/2003 | Yang |
| D481,187 S | 10/2003 | Sofy |
| 6,719,194 B2* | 4/2004 | Richards ............. B65F 1/062 220/263 |
| D494,722 S | 8/2004 | Lin |
| 6,804,930 B2 | 10/2004 | Stravitz |
| 6,851,251 B2 | 2/2005 | Stravitz |
| 6,901,974 B2 | 6/2005 | Chomik |
| 6,920,994 B2 | 7/2005 | Lin |
| 6,925,781 B1 | 8/2005 | Knuth |
| 6,941,733 B2 | 9/2005 | Chomik |
| 6,974,029 B2 | 12/2005 | Morand |
| 6,993,891 B2 | 2/2006 | Richardson |
| 6,994,247 B2 | 2/2006 | Richards |
| D522,203 S | 5/2006 | Lin |
| D522,206 S | 5/2006 | Yang |
| 7,044,323 B2 | 5/2006 | Yang |
| 7,073,311 B2 | 7/2006 | Chomik |
| 7,077,283 B2 | 7/2006 | Yang |
| D526,103 S | 8/2006 | Sangteerasintop |
| 7,086,550 B2 | 8/2006 | Yang |
| 7,086,569 B2 | 8/2006 | Stravitz |
| D528,727 S | 9/2006 | Lin |
| 7,100,767 B2 | 9/2006 | Chomik |
| 7,114,314 B2 | 10/2006 | Stravitz |
| 7,114,534 B2 | 10/2006 | Chomik |
| 7,121,421 B2 | 10/2006 | Yang |
| D532,572 S | 11/2006 | Lin |
| 7,146,785 B2 | 12/2006 | Stravitz |
| D535,449 S | 1/2007 | Chen |
| D535,450 S | 1/2007 | Chen |
| D535,796 S | 1/2007 | Lin |
| 7,178,314 B2 | 2/2007 | Chomik |
| 7,225,943 B2 | 6/2007 | Yang |
| D567,466 S | 4/2008 | Lee |
| D567,467 S | 4/2008 | Lee |
| 7,406,814 B2 | 8/2008 | Morand |
| 7,963,414 B1 | 6/2011 | Stravitz |
| 8,235,237 B1 | 8/2012 | Stravitz |
| 8,266,870 B1 | 9/2012 | Stravitz |
| 8,266,871 B1 | 9/2012 | Stravitz |
| 8,393,489 B1 | 3/2013 | Stravitz |
| 8,684,218 B1 | 4/2014 | Stravitz |
| 8,939,310 B1 | 1/2015 | Stravitz |
| 8,973,774 B1 | 3/2015 | Stravitz |
| 9,056,716 B1 | 6/2015 | Stravitz |
| 2002/0066261 A1 | 6/2002 | Richards |
| 2003/0213804 A1 | 11/2003 | Chomik |
| 2004/0083681 A1 | 5/2004 | Stravitz |
| 2005/0044819 A1 | 3/2005 | Chomik |
| 2005/0106706 A1 | 5/2005 | Chomik |
| 2005/0183400 A1 | 8/2005 | Stravitz |
| 2005/0183401 A1 | 8/2005 | Stravitz |
| 2005/0188661 A1 | 9/2005 | Stravitz |
| 2005/0193691 A1 | 9/2005 | Stravitz |
| 2005/0193692 A1 | 9/2005 | Stravitz |
| 2005/0274093 A1 | 12/2005 | Stravitz |
| 2006/0021301 A1 | 2/2006 | Stravitz |
| 2006/0130438 A1 | 6/2006 | Stravitz |
| 2006/0130439 A1 | 6/2006 | Stravitz |
| 2006/0144839 A1 | 7/2006 | Yang |
| 2006/0186121 A1 | 8/2006 | Yang |
| 2006/0237458 A1 | 10/2006 | Yang |
| 2006/0237461 A1 | 10/2006 | Chomik |
| 2006/0248862 A1 | 11/2006 | Morand |
| 2006/0273089 A1 | 12/2006 | Chiou |
| 2007/0029323 A1 | 2/2007 | Yang |
| 2007/0125782 A1 | 6/2007 | Wong |
| 2007/0125792 A1 | 6/2007 | Pollack |
| 2007/0157581 A1 | 7/2007 | Webb |
| 2007/0175182 A1 | 8/2007 | Stravitz |
| 2007/0180798 A1 | 8/2007 | Stravitz |
| 2009/0127260 A1* | 5/2009 | Rousso et al. ................ 220/263 |

FOREIGN PATENT DOCUMENTS

| | | |
|---|---|---|
| JP | 06-156601 | 6/1994 |
| JP | 07-061503 | 3/1995 |
| JP | 11-059635 | 3/1999 |
| JP | 2000118604 | 4/2000 |
| JP | 2001080705 | 3/2001 |
| JP | 2002-337802 | 11/2002 |

(56) References Cited

FOREIGN PATENT DOCUMENTS

KR   1020050032963   4/2005
WO   2007/071054    6/2007

OTHER PUBLICATIONS

Final Office Action dated Jan. 8, 2013 from Japanese Application No. 2010-534046.
Examination Report dated May 24, 2012 from corresponding Canadian Application No. 2705794.
Search Report dated Mar. 27, 2013 from European Application No. 08849654.2-1707.
Reason for rejection dated Nov. 20, 2012 from Corresponding Korean Patent Application No. 2010-7012833.
Reason for rejection dated Nov. 20, 2012 from Corresponding Korean Patent Application No. 2012-7018757.
PCT/US2008/12824 dated May 19, 2011.
Notification of first Office Action from Corresponding Chinese Application No. 200880124733.9 dated Apr. 20, 2011.
International Preliminary Report on Patentability from Corresponding Application No. PCT/US2008/12824 dated May 19, 2011.

* cited by examiner

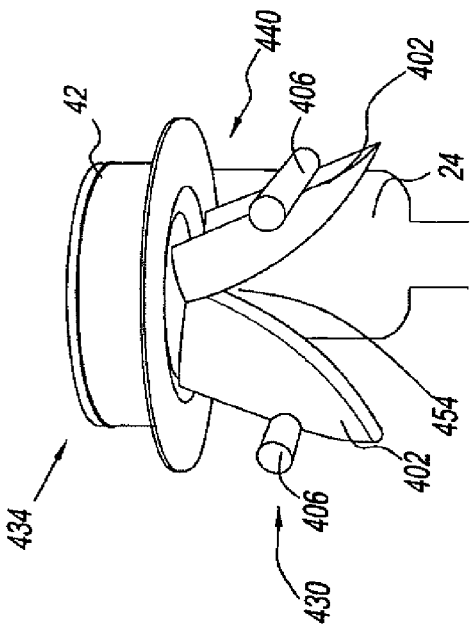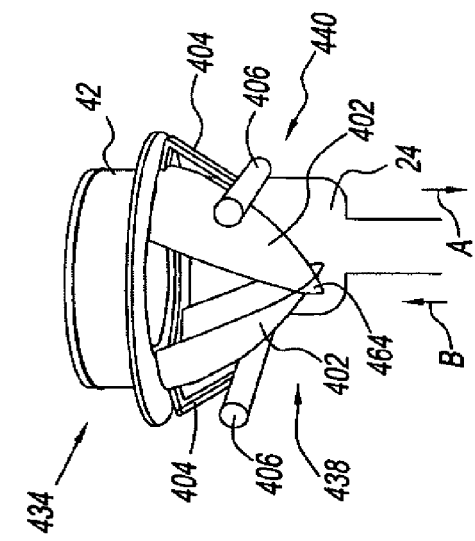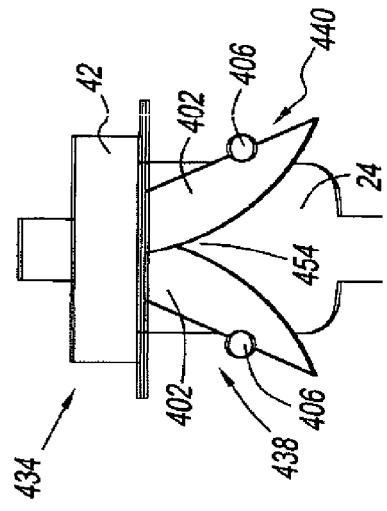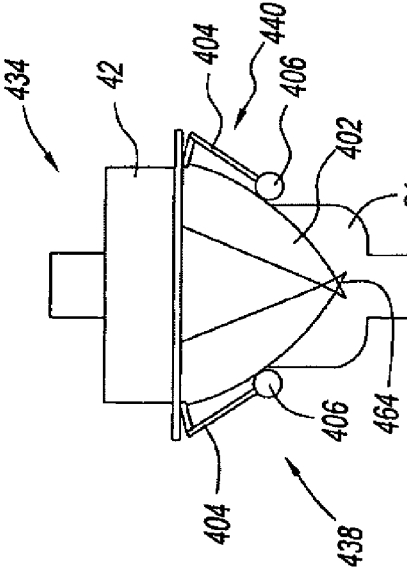
Fig. 32
Fig. 34
Fig. 33
Fig. 35

WASTE DISPOSAL SERVICES AND METHODS

CROSS REFERENCE TO RELATED APPLICATIONS

This application is a continuation application of U.S. patent application Ser. No. 12/080,178, filed Apr. 1, 2008, now U.S. Pat. No. 8,613,371, which is a continuation-in-part application of U.S. patent application Ser. No. 11/985,734 filed Nov. 16, 2007, now abandoned. Each of the above-noted applications is incorporated herein by reference.

BACKGROUND OF THE INVENTION

1. Field of the Invention

The present disclosure relates generally to waste disposal devices and methods. More particularly, the present disclosure relates to devices and methods for odorless and sanitary disposal of waste such as, but not limited to, diapers, nappies, training pants, and incontinence products.

2. Description of Related Art

The use of disposable diapers, nappies, training pants, and incontinence products leads to unique and complex disposal issues. Specifically, diapers, training pants, nappies, and incontinence products are generally used to collect human excrement. Thus, bothersome and/or embarrassing odors and germs can emit from these products after use. Similar odor and sanitary problems exist with many other types of waste.

The immediate removal of waste from the home, office, automobile, or other living or working space eliminates the odor. Unfortunately, such immediate removal of the waste is often times inconvenient. Alternately, the waste can be collected or held in a disposal container until such time as it is convenient to remove the collected waste.

Unfortunately, the odor can become quite strong and offensive when the waste is collected in this manner. For example, the collection of waste in baskets or receptacles, which have an open top, have obviously proven ineffective at containing such odors and germs. Similarly, trash cans or receptacles, which have a lid that selectively opens and closes the open top, have also proven ineffective at containing such odors, particularly once the lid has been opened to receive additional waste.

In an attempt to resolve one or more of the above issues, various efforts have been made to contain the odor of this type of waste. One such approach is presented in U.S. Patent Application Publication No. 200610248862 A1, which describes an apparatus for packing disposable objects. The apparatus includes a closing mechanism having first and second portions. The second portion is biased in a closed position against the first. The second portion has a receiving surface and is slidable from the closed position to an open position through the application of a downward force on the receiving surface. Unfortunately, the downward force is applied by the user, who while hold the waste in their hand, pushes the waste against the receiving surface and into the waste storage area.

Accordingly, it has been determined by the present disclosure there is a need for waste disposal devices and methods that overcome, alleviate, and/or mitigate one or more of the aforementioned and other deleterious effects of the prior art.

BRIEF SUMMARY OF THE INVENTION

A waste disposal device for collecting waste that can be easily operated in a hands free manner, while eliminating the emanation of odor before, during, and after use is provided.

A waste disposal device for collecting waste within a liner material having an open end and a closed end is provided. The waste disposal device includes a housing, a lid, a bucket frame, a pair of bucket members, and a foot pedal. The housing has an opening to allow access to an inner storage area. The lid is pivotally secured to the housing at the opening for movement between an open position and a closed position. The bucket frame is positioned at the opening. The pair of bucket members is pivotally secured to the bucket frame for movement between a use position and a non-use position. The foot pedal is pivotally secured to the housing for movement between an upper position and a lower position. The foot pedal is also operatively associated with the lid and the pair of bucket members so that when the foot pedal is in the upper position, the lid is in the closed position and the pair of bucket members is in the non-use position. Further, the foot pedal is operatively associated with the lid and the pair of bucket members so that when the foot pedal is in the lower position, the lid is in the open position and the pair of bucket members is in the use position.

A method for disposing waste is also provided. The method includes forming a first pinch seal on a liner material when a waste disposal device is in a non-use position. The first pinch seal is above an inner storage area having waste collected therein. The method also includes forming a second pinch seal on the liner material when the waste disposal device is in a use position. The second pinch seal is above the inner storage area for collecting waste therein.

A waste disposal device that includes a lower housing, an upper housing, a hinge, a lid, a foot pedal, a lower push rod, and an upper push rod is provided. The hinge secures the upper and lower housings so that the lower housing pivots about an axis with respect to the upper housing between an open position and a closed position. The closed position defines an inner storage area, with the axis being exterior to the inner storage area. The lid is pivotally secured to the upper housing, while the foot pedal is pivotally secured to the lower housing. The lower push rod has a lower end operatively associated with the foot pedal, and the upper push rod has an upper end operatively associated with the lid. The upper and lower push rods are operatively associated with one another in the inner storage area.

A cassette for a waste disposal device is also provided that includes a supply of tubular stock for the incremental withdrawal of portions thereof. The tubular stock includes a pressure sensitive adhesive system internal to the tubular stock.

The above-described and other advantages and features of the present disclosure will be appreciated and understood by those skilled in the art from the following detailed description, drawings, and appended claims.

BRIEF DESCRIPTION OF THE DRAWINGS

FIG. 32 is a perspective view of a fourth exemplary embodiment of a bucket assembly according to the present disclosure shown in the open or use position;

FIG. 33 is a front view of the bucket assembly of FIG. 32;

FIG. 34 is a perspective view of the bucket assembly of FIG. 32 shown in the closed or non-use position;

FIG. 35 is a front view of the bucket assembly of FIG. 34;

DETAILED DESCRIPTION OF THE INVENTION

Figure 1:
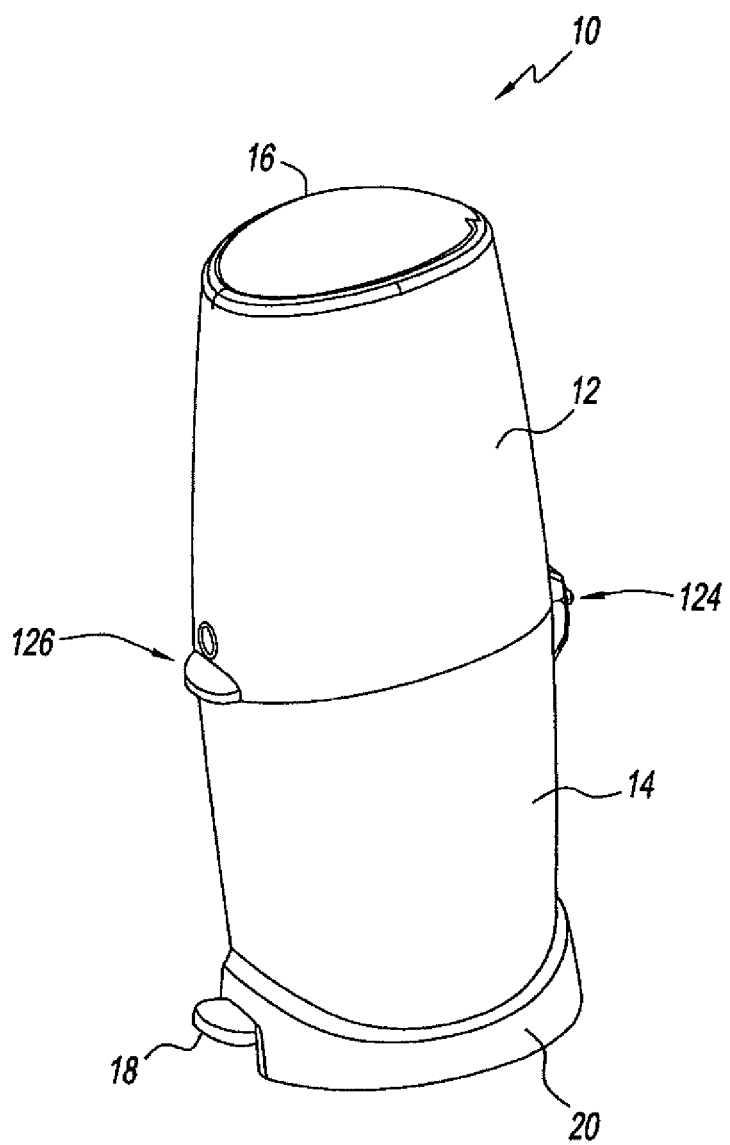
FIG. 1 is a top perspective view of an exemplary embodiment of a waste disposal device according to the present disclosure.

Referring to the drawings and in particular to FIG. 1, an exemplary embodiment of a waste disposal device according to the present disclosure is generally referred to by reference numeral 10.

In some embodiments, waste disposal device 10 is configured so that depressing a foot pedal causes a lid to open and causes an internal waste bucket assembly to move to an open position for receipt of the waste therein. After placing the waste in the open bucket assembly and releasing the foot pedal, the lid closes automatically, while the bucket assembly returns to a normal or closed position. Advantageously, the internal waste bucket assembly forms a pressure or pinch seal of the waste liner in both its open and closed positions, which mitigates odor emanation.

As illustrated in FIG. 1, waste disposal device 10 includes an upper housing 12, a lower housing 14, a lid 16, and a foot pedal 18.

In some embodiments, lower housing 14 can include a shroud 20 to increase the stability of the device 10 during use. Shroud 20 can be integral with or separate from lower housing 14. Shroud 20 can increase the stability of waste disposal device 10 by increasing the weight of the device, increasing the base footprint of the device, or any combinations thereof.

Upper housing 12 includes an opening where lid 16 is pivotally secured to the upper housing at the opening to selectively open and close the opening. When lid 16 is open, the lid allows access to an inner storage area defined by upper and lower housings 12, 14 via the housing opening.

Figure 4:
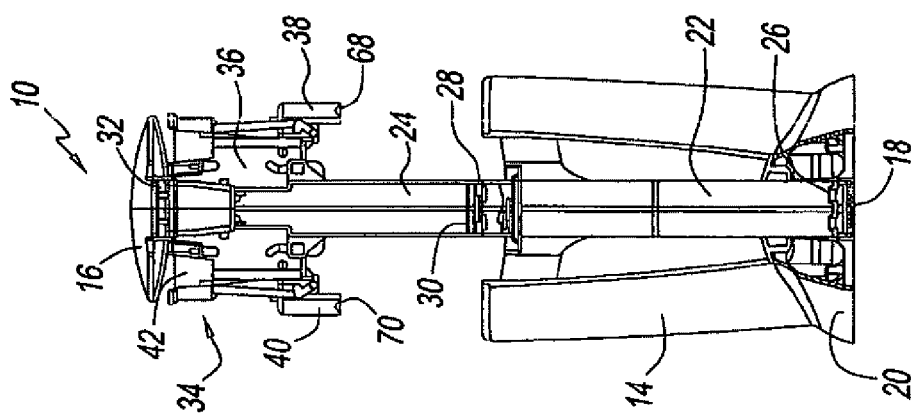
FIG. 4 is a rear view of the waste disposal device of FIG. 3.
Figure 3:
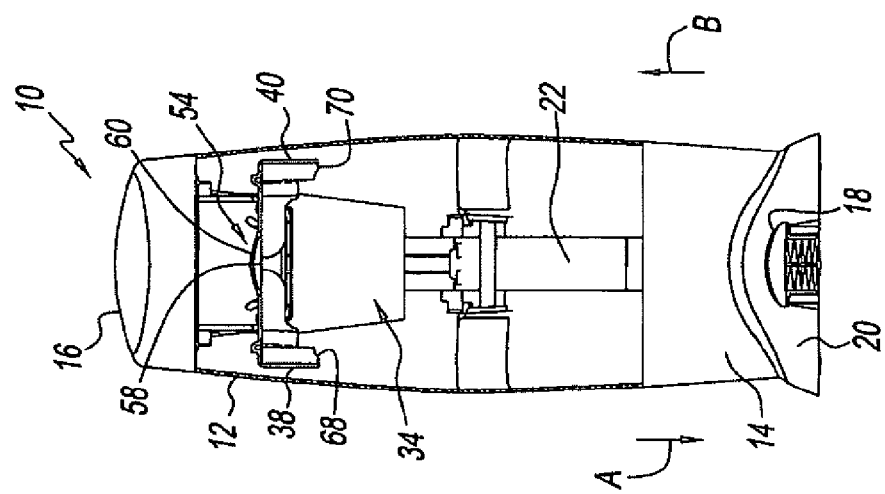
FIG. 3 is a front partial sectional view of the waste disposal device of FIG. 2 taken along lines 3-3.
Figure 2:
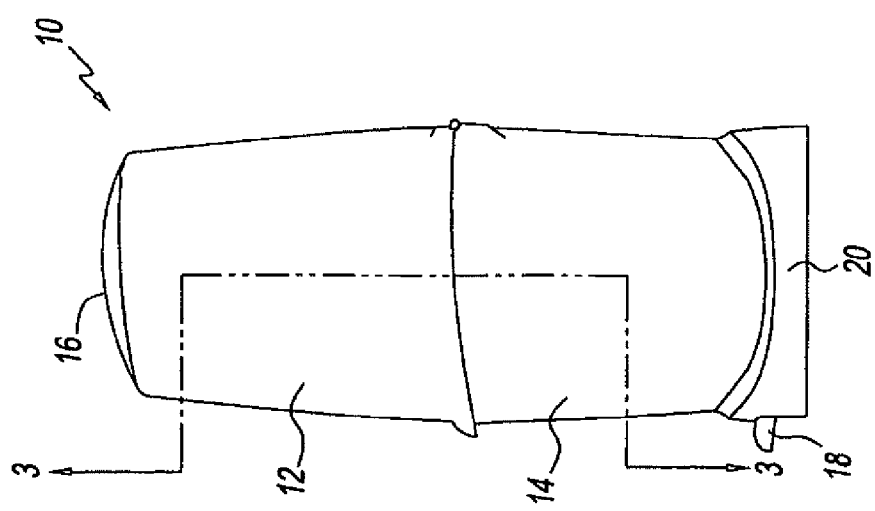
FIG. 2 is a side view of the waste disposal device of FIG. 1 shown in a closed or non-use position.
Figure 7:
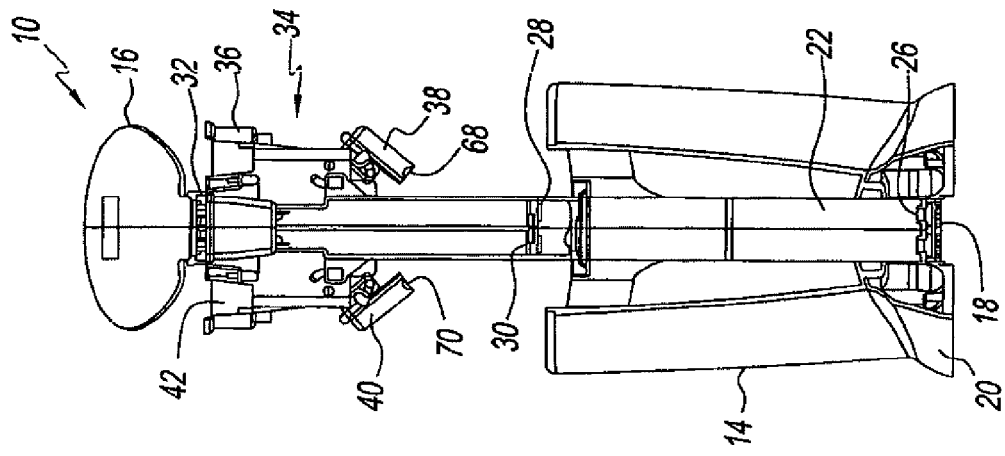
FIG. 7 is a rear view of the waste disposal device of FIG. 6.
Figure 6:
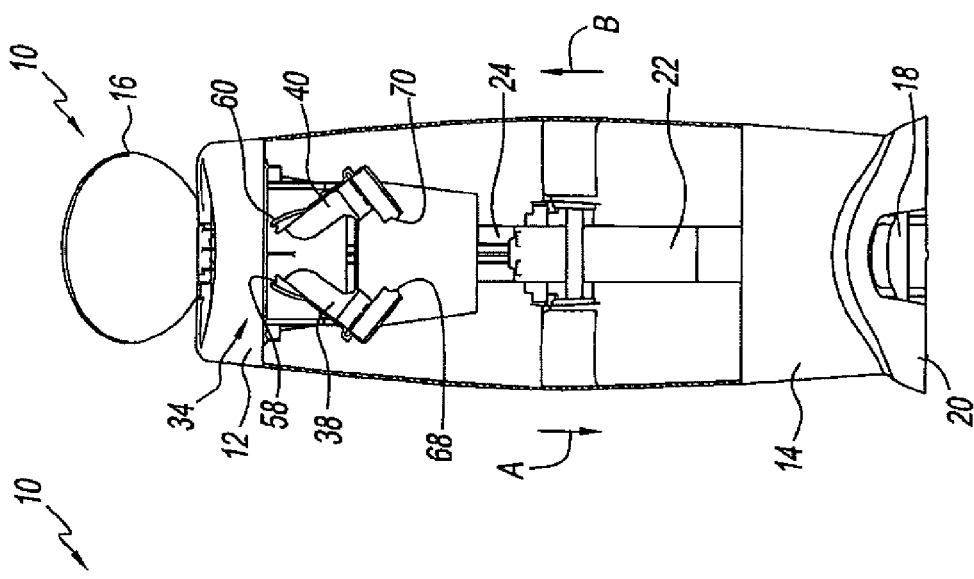
FIG. 6 is a partial sectional view of the waste disposal device of FIG. 5 taken along lines 6-6.
Figure 5:
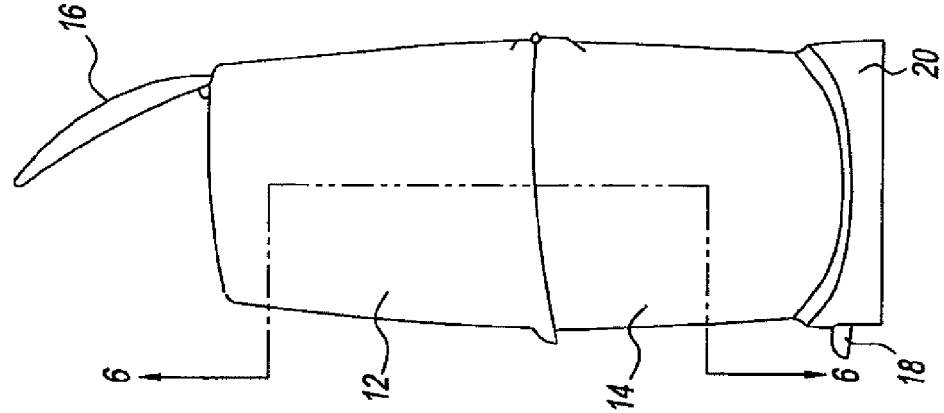
FIG. 5 is side view of the waste disposal device of FIG. 1 shown in a partially open position.
Figure 10:
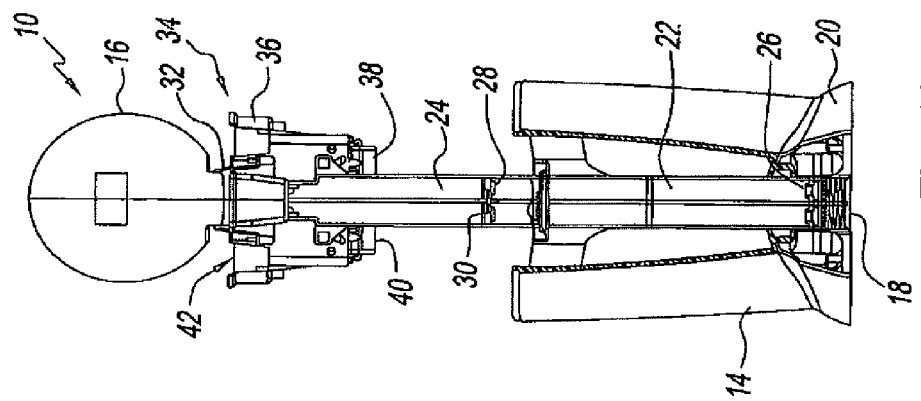
FIG. 10 is a rear view of the waste disposal device of FIG. 9.
Figure 9:
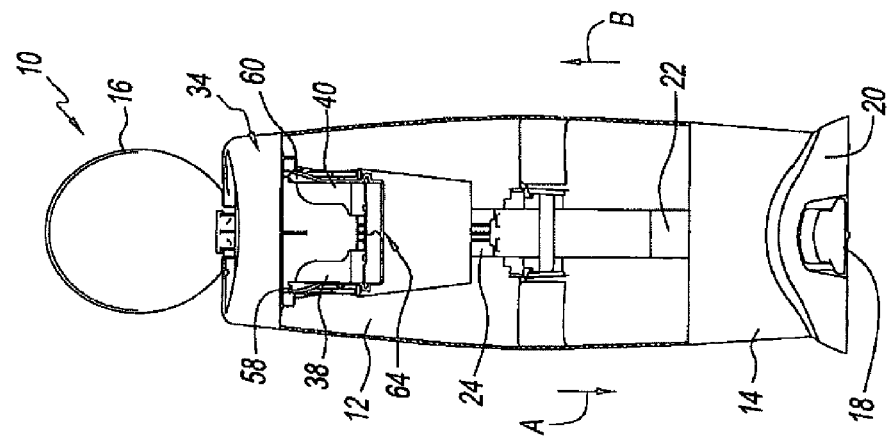
FIG. 9 is a partial sectional view of the waste disposal device of FIG. 8 taken along lines 9-9.
Figure 8:
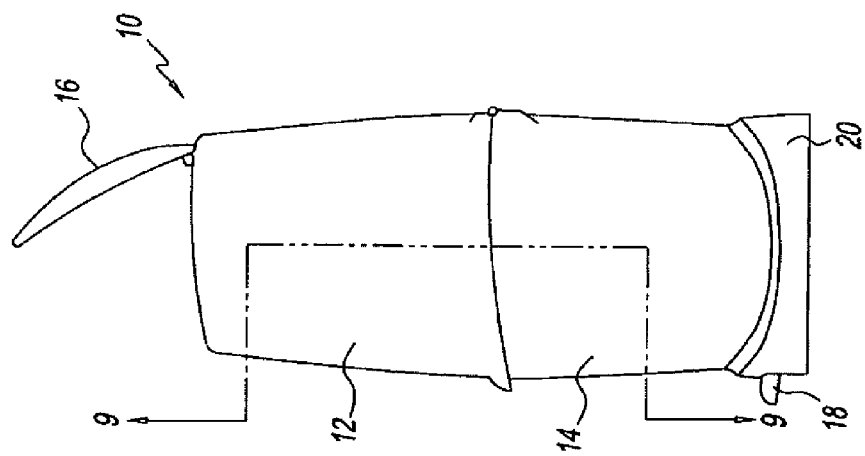
FIG. 8 is a side view of the waste disposal device of FIG. 1 shown in a fully open or use position.

The operation of waste disposal device 10 is described with simultaneous reference to FIGS. 2 through 10. FIGS. 2 through 4 illustrate waste disposal device 10 in a closed or non-use position. FIGS. 5 through 7 illustrate waste disposal device 10 in a mid-position between the open and closed positions. FIGS. 8 through 10 illustrate waste disposal device 10 in an open or use position.

Pedal 18 is pivotally secured to lower housing 14 for movement between a normal or upper position (FIGS. 2-4) and a use or lower position (FIGS. 8-10). Pedal 18 is operatively associated with lid 16 so that when the pedal is in the normal or upper position (FIGS. 2-4), the lid is in a closed position (FIGS. 2-4). Further, pedal 18 is operatively associated with lid 16 so that when the pedal is in the use or lower position (FIGS. 8-10), the lid is in an open position (FIGS. 8-10).

In the illustrated embodiment, waste disposal device 10 includes a lower push rod 22 and an upper push rod 24. Lower push rod 22 has a lower end 26 and an upper end 28. Similarly, upper push rod 24 has a lower end 30 and an upper end 32. Lower end 26 of the lower push rod 22 is operatively connected to pedal 18, while upper end 32 of the upper push rod 24 is operatively connected to lid 16. Further, upper end 28 of the lower push rod 22 is operatively associated with lower end 30 of the upper push rod 24. In this manner, movement of foot pedal 18 in a downward direction (A) moves lower push rod 22 in an upward direction (B), which in turn moves upper push rod 24 in the upward direction. Movement of upper push rod 24 in the upward direction (B) causes upper end 32 of the upper push rod to act on lid 16 so as to move the lid from the closed position (FIG. 2) to the open position (FIG. 8).

Waste disposal device 10 includes a waste bucket assembly 34 that is also operatively associated with pedal 18. Waste bucket assembly 34 includes a bucket frame 36, a first bucket portion 38, and a second bucket portion 40. First and second bucket portions 38, 40 are pivotally secured to bucket frame 36 for movement between a closed or non-use position (FIGS. 2-4) and an open or use position (FIGS. 8-10).

Accordingly, movement of foot pedal 18 in downward direction (A) moves lower push rod 22 in an upward direction (B), which in turn moves upper push rod 24 in the upward direction. Movement of upper push rod 24 in the upward direction (B) causes the upper push rod to act on assembly 34 to move first and second bucket portions 38, 40 from the closed or non-use position to the open or use position.

In this manner, waste disposal device 10 allows for easy, hands free operation by merely stepping on or otherwise moving foot pedal 18 in the downward direction (A).

Figure 11:
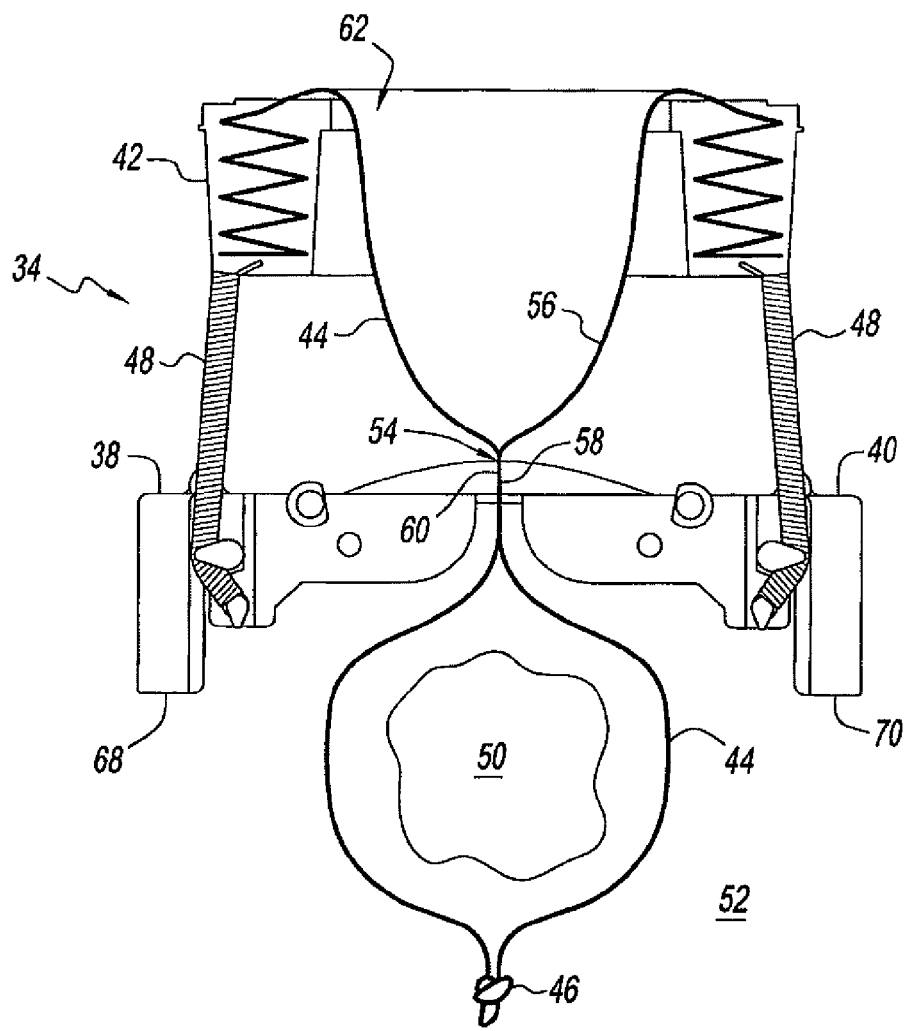
FIG. 11 is a close-up view of portions of a first exemplary embodiment of a bucket assembly shown in the closed or non-use position.
Figure 12:
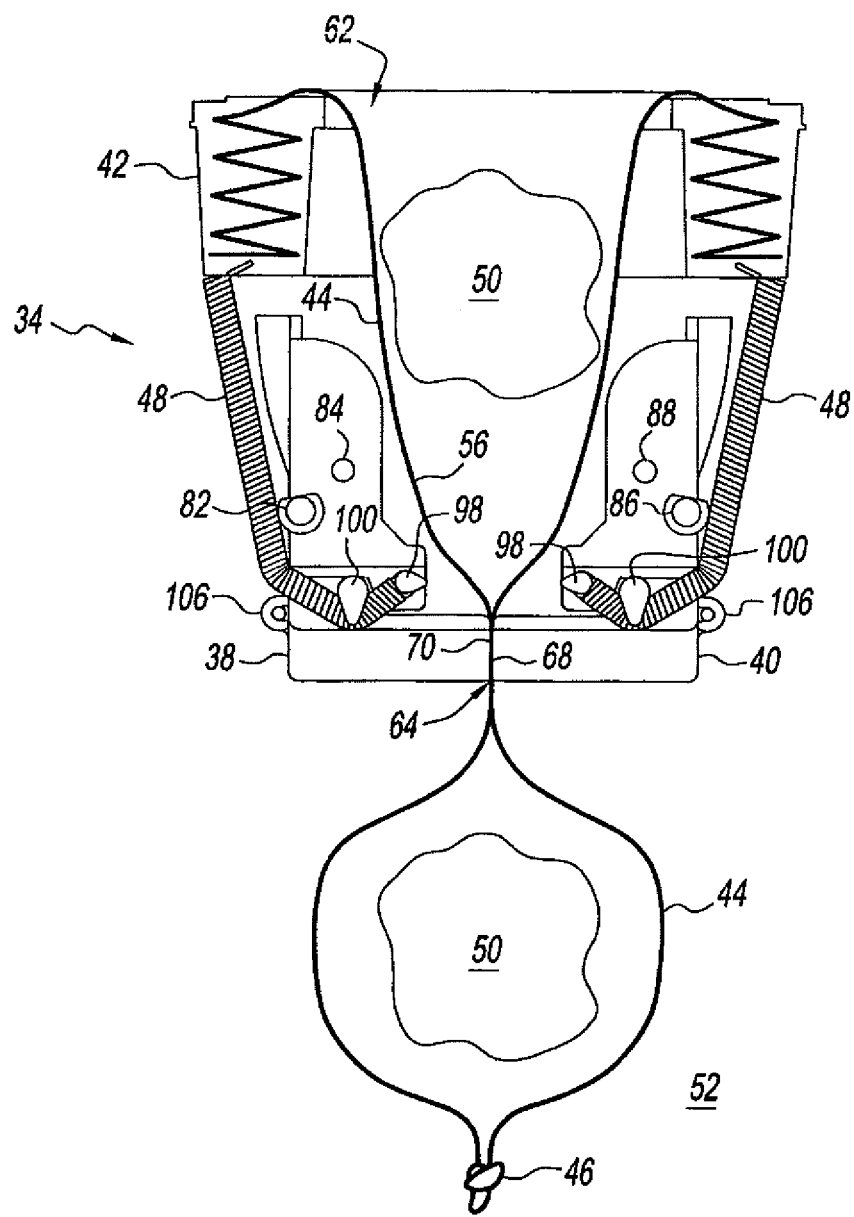
FIG. 12 is a close-up view of portions of the bucket assembly fully shown in the open or use position.
Figure 13:
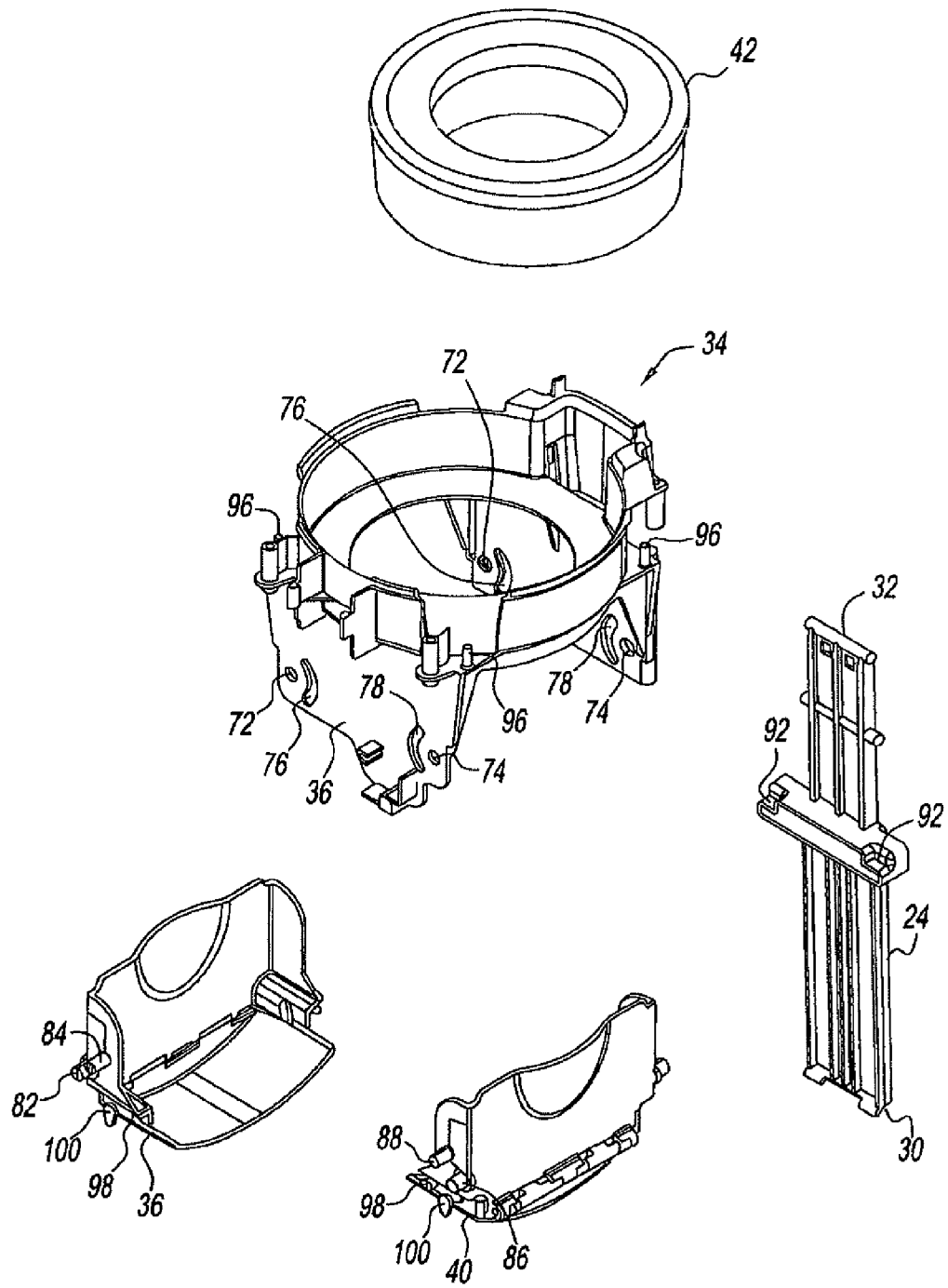
FIG. 13 is a top, front perspective view of portions of the bucket assembly, the cassette, and the upper push rod according to the present disclosure.

Referring now to FIGS. 11 through 13, waste bucket assembly 34 removably receives a cassette 42 in bucket frame 36 in a known manner. Cassette 42 houses a length or supply of liner material 44, in the form of tubular stock in a folded or pleated position within the cassette, for the incremental withdrawal of portions thereof in a known manner. For example, cassette 42 can be one as disclosed in commonly owned U.S. Pat. No. 6,170,240, U.S. Pat. No. 7,073,311, U.S. Pat. No. 7,100,767, and U.S. patent application Ser. No. 11/800,324, the entire contents of each of which are incorporated by reference herein.

Cassette 42 can be removed and replaced as needed. For example, cassette 42 can be replaced by simply opening lid 16, removing the empty cassette 42 from bucket frame 36, placing a full cassette 42 into the bucket frame, and closing the lid 16. Thus, bucket frame 36 secures an open end 62 of liner material 44 between lid 16 and bucket portions 38, 40.

During use, a user installs cassette 42 in bucket frame 36, withdraws a length of liner material 44 from the cassette, feeds the length of liner material 44 through bucket portions 38, 40 so that the open end is in lower housing 14, and closes or seals off the open end of the liner material 44 with, for example, a knot 46. To place waste 50 such as, but not limited to, disposable diapers, nappies, training pants, and incontinence products, into device 10, the user merely opens lid 16 by stepping on or otherwise depressing pedal 18. In this position, first and second bucket portions 38, 40 are in the open or use position illustrated in FIG. 12, as well as FIGS. 8 through 10.

As seen in FIG. 12, the user then places waste 50 into liner material 44, which is located within the open first and second bucket portions 38, 40. After placing waste 50 into device 10, the user merely releases foot pedal 18, at which time, lid 16 closes and first and second bucket portions 38, 40 move to the closed position as seen in FIG. 11, as well as FIGS. 2 through 4.

As first and second bucket portions 38, 40 move to the closed position under the spring force of biasing members 48, waste 50 is urged into the inner storage area 52 of device 10. Further, waste 50 is urged into the inner storage area 52 of device 10 due to gravitational force acting on the waste.

Waste 50 is maintained within liner material 44 between knot 46 and a first pinch closure 54. First pinch closure 54 is defined by leading edges 58, 60 of first and second bucket portions 38, 40, respectively as shown in FIG. 11. The pressure of first pinch closure 54 is maintained by the spring force of biasing members 48. In some embodiments, device 10 provides first pinch closure 54 with a closing force of between about 0.5 pounds to about 5 pounds, more preferably between about 1.25 pounds to about 2 pounds, and all subranges therebetween. As used herein with respect to the closing force, the term about shall mean ±0.1 pounds or less. In other embodiments, first pinch closure 54 provides a seal having a surface area of about 0.25 square inches (in$^2$) to about 0.5 in$^2$, more preferably about 0.375 in$^2$, and any subranges therebetween. As used herein with respect to the surface area, the term about shall mean ±0.1 inches or less.

In this manner, first pinch closure 54 mitigates the emanation of odor from waste 50 from inner storage area 52 when device 10 is closed.

When adding subsequent waste 50 into device 10, the user again opens lid 16 by stepping on pedal 18, moving first and second bucket portions 38, 40 to the open position. In this position, waste 50 is maintained within liner material 44 between knot 46 and a second pinch closure 64. Second pinch closure 64 is defined by trailing edges. 68, 70 of first and second bucket portions 38, 40, respectively as shown in FIG. 12. The pressure of second pinch closure 64 is defined by the pressure applied by the user on foot pedal 18. In some embodiments, device 10 provides second pinch closure 64 with a closing force of between about 0.5 pounds to about 5 pounds, more preferably between about 3.5 pounds to about 4.5 pounds, and all subranges therebetween. In other embodiments, second pinch closure 64 provides a seal having a surface area of about 0.25 in$^2$ to about 0.5 in$^2$, more preferably about 0.375 in$^2$, and any subranges therebetween.

In this manner, second pinch closure 64 mitigates the emanation of odor from waste 50 from inner storage area 52 when device 10 is open.

Accordingly, waste disposal device 10, when not in use, reduces odors emanating from waste 50 collected within liner material 44 by forming first pinch closure 54. Further, waste disposal device 10, when in use, reduces odors emanating from waste 50 collected within liner material 44 by forming second pinch closure 64.

It should be recognized that waste disposal device 10 of present disclosure is described above by way of example making use of cassette 42 and liner material 44. However, it is contemplated by the present disclosure for device 10 to find equal use with any liner material 44 such a plastic trash bag configured to be received by device 10. In this embodiment, device 10 does not require cassette 42, but rather liner material 44 has an upper end secured at bucket frame 36 above first and second pinch closures 54, 64.

In another embodiment of the present disclosure having cassette 42, the cassette can include liner material 44 having a pressure sensitive adhesive system 56 disposed thereon. System 56 is defined on liner material 44 so that the system is internal to the liner material.

In this manner, system 56 adhesively seals liner material 44 to itself due to the pressure applied by first pinch closure 54, second pinch closure 64, or any combinations thereof. Examples of suitable pressure sensitive adhesive systems 56 contemplated by the present disclosure include those described in U.S. Pat. Nos. 5,662,758, 5,965,235, 6,194,062, and 6,489,022, the entire contents of each of which are incorporated by reference herein.

Accordingly, odor from waste 50 collected within liner material 44 is not only prevented from emanating due to first and second pinch closures 54, 64 but also due to the adhesive seal, above and/or below each piece of waste 50, that is created by the interaction of the pinch closures with pressure sensitive adhesive system 56.

An exemplary embodiment of the interaction of upper push rod 24 and bucket assembly 34 is described with simultaneous reference to FIGS. 11 through 15. Bucket frame assembly 34 is secured inside of upper housing 14 proximate lid 16, while first and second bucket portions 38, 40 are pivotally secured to bucket frame 36.

Bucket frame 36 includes a pair of first pivot openings 72, a pair of second pivot openings 74, a pair of first cam slots 76, and a pair of second cam slots 78. First bucket portion 38 includes a pair of first pivot members 82 and a pair of first cam members 84. Similarly, second bucket portion 40 includes a pair of second pivot members 86 and a pair of second cam members 88.

First bucket portion 38 is received in bucket frame 36 so that first pivot members 82 are pivotally received in first pivot openings 72, respectively, and so that first cam members 84 are received in first cam slots 76. Further, second bucket portion 40 is received in bucket frame 36 so that second pivot members 86 are pivotally received in second pivot openings 74, respectively, and so that second cam members 88 are received in second cam slots 78.

In this manner, first bucket portion 38 rotates in bucket frame 36 about first pivot members 82, while second bucket member 40 rotates in the bucket frame 36 about second pivot members 86. Further, the rotation of first and second bucket portions 38, 40 are defined by the interaction of cam slots 76, 78 with cam members 84, 88.

Figure 15:
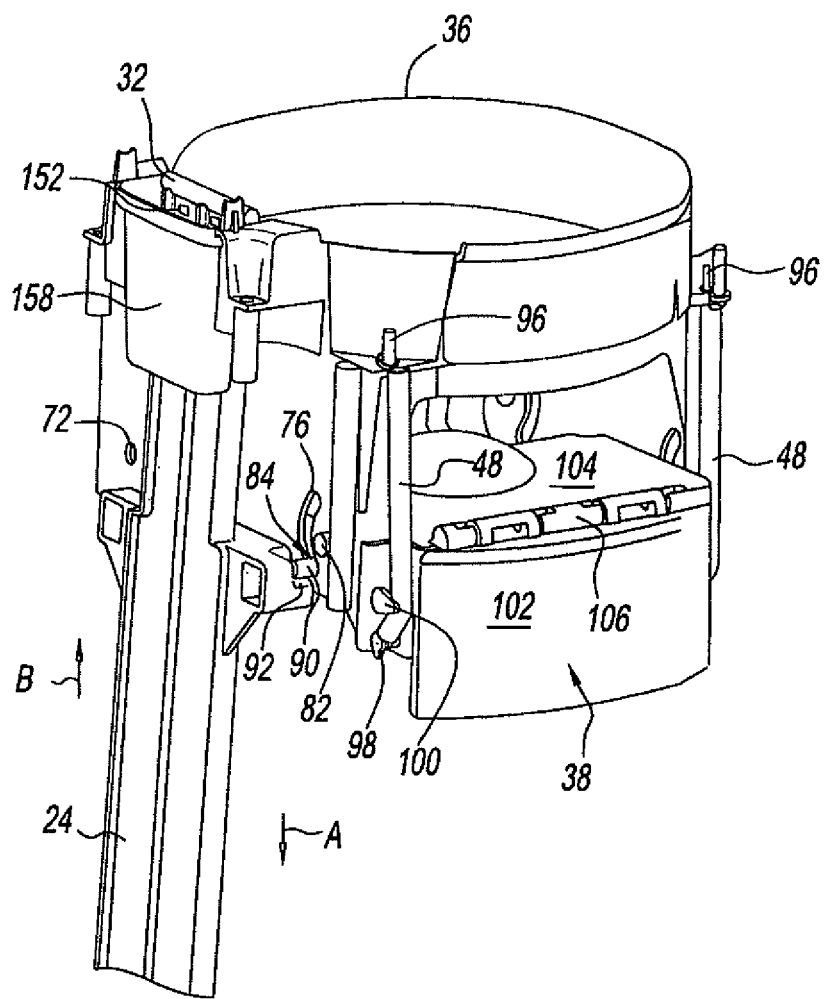
FIG. 15 is a rear perspective view of the upper push rod shown and portions of the bucket assembly, which is shown in the closed or non-use position.

Cam members 84, 88 extend through bucket frame 36 so that an extended portion 90 is defined on an exterior of the bucket frame (FIG. 15). Upper push rod 24 includes a surface 92 that is operatively associated with extension member 90. In this manner, movement of upper push rod 24 in the upward direction (B) causes surface 92 to push extended portion 90 in the upward direction so that cam members 84, 88 travel along or follow cam slots 76, 78, respectively. Movement of extended portion 90 in the upward direction (B) causes first and second bucket portions 38, 40 to rotate about pivot members 82, 86, respectively. Thus, push rod 24 is effective at moving first and second bucket portions 38, 40 from the closed position (FIG. 11) to the open position (FIG. 12).

Bucket assembly 34 also includes one or more biasing members 48 for each bucket portion 38, 40. In the illustrated embodiment, bucket assembly 34 includes two biasing members 48 for first bucket portion 38 and two biasing members 48 for second bucket portion 40. Of course, more or less than two biasing members 48 for each bucket portion 38, 40 are contemplated by the present disclosure. Also in the illustrated embodiment, biasing members 48 are shown as tension springs. Of course, other biasing members 48 such as, but not limited, to elastic bands, rotary springs, or any combinations thereof are contemplated by the present disclosure.

Biasing members 48 are configured to return bucket portions 38, 40 from the open position to the closed position upon release of pressure from foot pedal 18. Further, biasing members 48 are configured to return lid 16 from the open position to the closed position upon release of pressure from foot pedal 18 and are configured to return foot pedal 18 to its normal or lower position.

Figure 14:
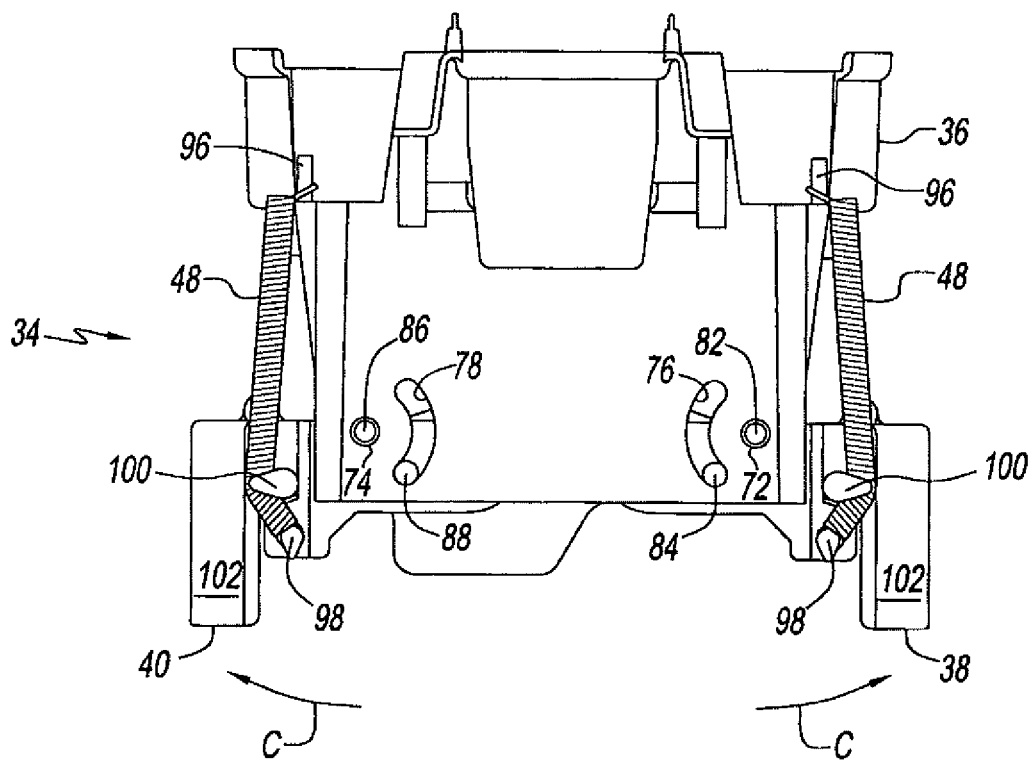
FIG. 14 is a rear view of portions of the bucket assembly, which is shown in the closed or non-use position.

Bucket frame 36 includes retainers 96 configured to secure an upper end of biasing members 48 to the bucket frame as shown in FIGS. 13-15. First and second bucket portions 38, 40 each include retainers 98 configured to secure a lower end of biasing members 48 to the first and second bucket portions, respectively. In addition, first and second bucket portions 38, 40 each include a fulcrum member 100. Fulcrum member 100 transmits the biasing or spring force of biasing members 48 onto first and second bucket portions 38, 40 in an outward direction (C).

In this manner, biasing members 48 normally bias lid 16 and bucket assembly 34 to the closed or non-use position (FIG. 3). When bucket assembly 34 is biased to the closed or non-use position, extended portion 90 of the bucket assembly is operatively associated with surface 92 of upper push rod 24 to bias the upper push rod in the downward direction (A), which in turn biases lower push rod 22 in the downward direction (A) and foot pedal 18 to its normal or upper position (FIG. 3). In use, a user applies an amount of pressure to foot pedal 18 that is sufficient to overcome the biasing or spring force of biasing members 48. Once the biasing or spring force of biasing members 48 has been overcome, lid 16 and bucket assembly 36 move to the open or use position. Conversely, releasing the pressure from foot pedal 18 results in the biasing or spring force of biasing members 48 to return lid 16 and bucket assembly 36 to the closed or non-use position and pedal to the normal or upper position.

As illustrated with reference to FIGS. 12 and 15, first and second bucket portions 38, 40 can, in some embodiments, each be formed of a lower section 102 and an upper section 104 that are secured to one another by a hinge 106. In normal use, lower section 102 and upper section 104 are maintained by biasing members 48 in a generally perpendicular relationship to one another so that first and second bucket portions 38, 40 define a generally L-shaped member. However, and in the event of a jam or other condition within device 10 when first and second bucket portions 38, 40 are in the open or use position of FIG. 12, a user can push on waste 50 so as to overcome the biasing or spring force of biasing members 48. Overcoming the biasing or spring force of biasing members 48 causes lower section 102 to rotate with respect to upper section 104 about hinge 106 so that the lower and upper sections move to a generally linear relationship to one another.

Figure 16:
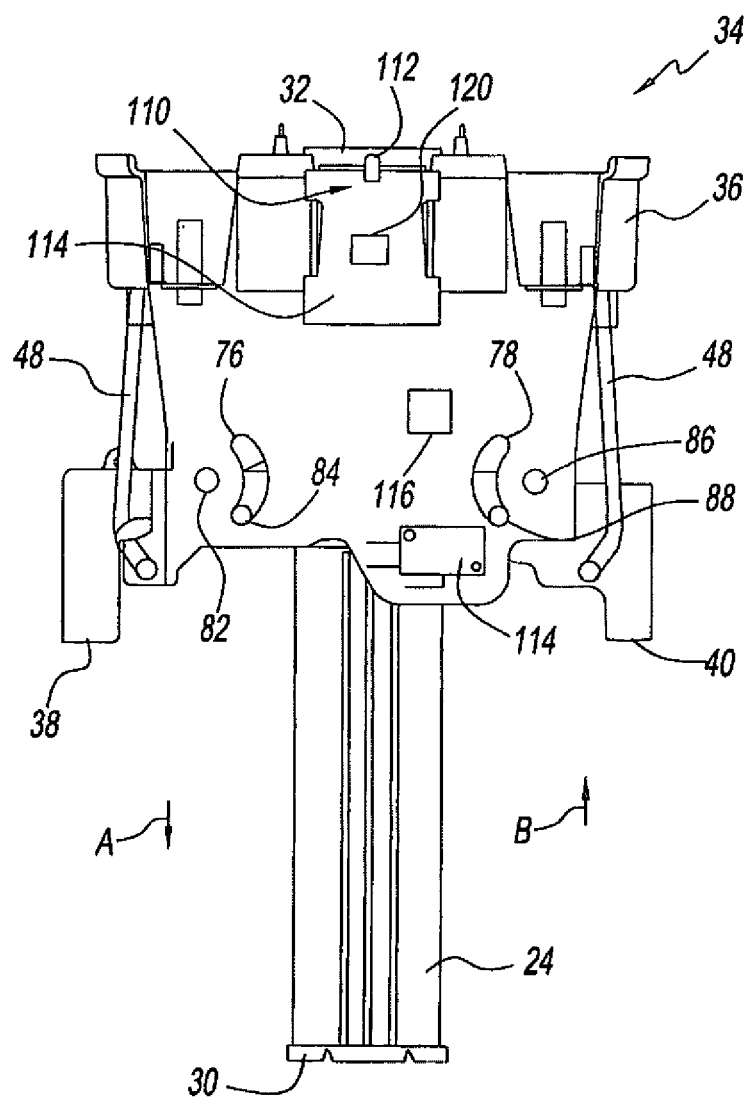
FIG. 16 is a front view of the bucket assembly having an exemplary embodiment of a warning device.
Figure 17:
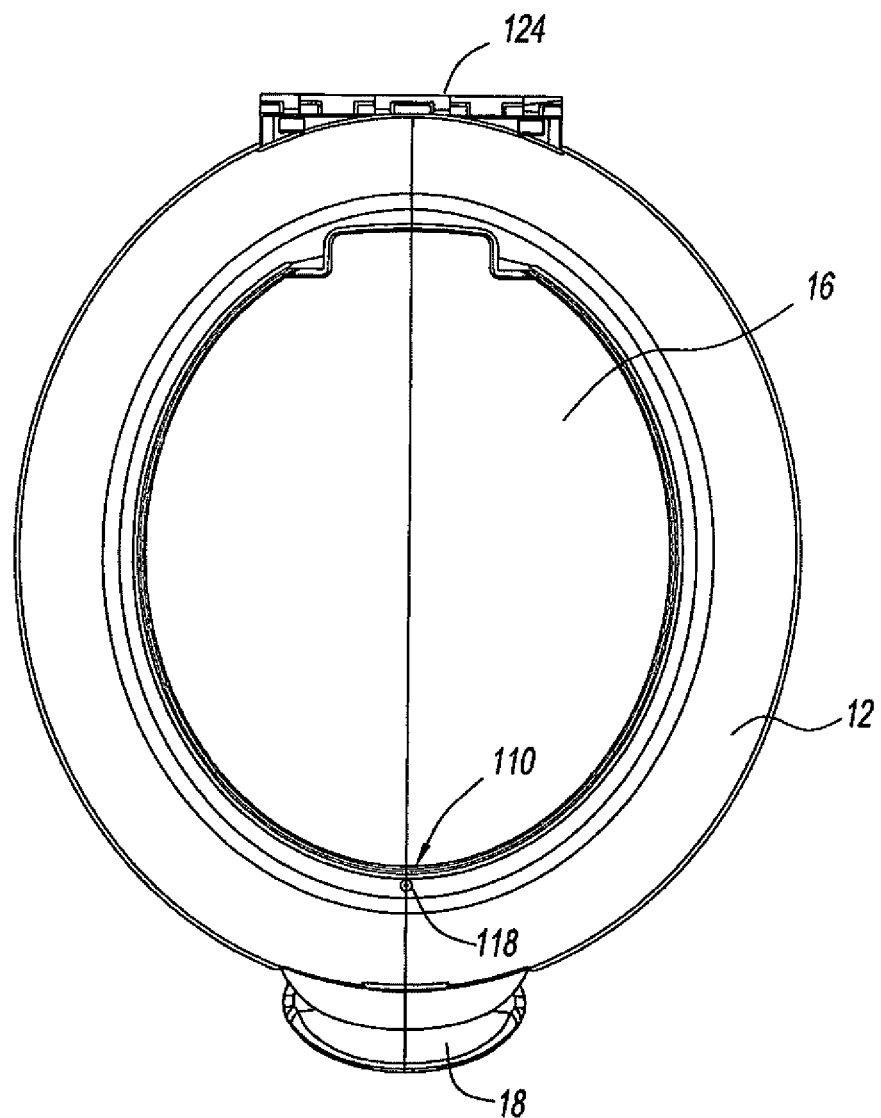
FIG. 17 is a top view of the waste disposal device illustrating the warning device of FIG. 16.

Referring to FIGS. 16 and 17, in one embodiment, waste disposal device 10 includes a warning system 110. Warning system 110 alerts a user to a condition where bucket portions 38, 40 remain in an open or partially open state so that first pinch closure 54 is not formed. Warning system 110 includes an indicator device 112, one or more switches 114 (only one shown), and a power source 116.

Indicator device 112 can be a sensory device, including, but limited to, a lighting device such as a light emitting diode (LED), an audible device such as a speaker, or any combinations thereof. In the illustrated embodiment, indicator device 112 is shown as an LED 118 protruding through an opening in upper housing 14.

Power source 116 can be any source of electrical energy such as, but not limited to, a battery, a power cord configured to electrically communicate with an electrical outlet, or any combinations thereof.

Switch 114 is positioned on bucket assembly 34 to detect the position of first cam member 84 and/or second cam member 88. For example, switch 114 is positioned to be contacted by first cam member 84 and/or second cam member 88 when the cam members bucket portions 38, 40 are in the closed or non-use position.

Of course, it is contemplated by the present disclosure for switch 114 to be in any desired position sufficient to detect the position of bucket portions 38, 40. For example, It is contemplated by the present disclosure for switch 114 to sense the position of bucket portions 38, 40 directly at the sealing surfaces (i.e., first and/or second pinch closures 54, 64) or indirectly at a location remote from the sealing surfaces such as at cam members 84, 88 or any other moveable portion of bucket assembly 34. Furthermore, it is contemplated by the present disclosure for switch 114 to include any type of switching device such as contact switches, magnetic sensing devices, optical sensing devices; or any combinations thereof.

When inner storage area 52 of waste disposal device 10 is full or a jam occurs in bucket portions 38, 40, first and second bucket portions 38, 40 may not close completely so that first pinch closure 54 is not formed. Switch 114 places power source 116 in electrical communication with indicator device 112 when the switches do not detect the presence of first and/or second cam members 84, 88. Thus, any time bucket portions 38, 40 move from the closed or non-use position, warning system 110 indicates to the user, via indicator device 112, that the bucket portions 38, 40 are open. In the event that lid 16 is closed and the indicator device 112 is activated, the user knows that a jam or full condition has occurred.

In some embodiments, warning system 110 can further include a circuit 120 configured to minimize the use of power source 116. Circuit 120 can be particularly useful to conserve energy when power source 116 is a battery. Here, circuit 120 waits a predetermined time period, such as about 15 seconds, after switch 114 no longer detects the presence of first and/or second cam members 84, 88 before activating indicator device 112. Further, circuit 120 can be configured to cycle indicator device 112 between an activated and inactivated state after switch 114 no longer detects the presence of first and/or second cam members 84, 88 to further reduce the consumption of energy from power source 116.

In one embodiment, warning system 110 is configured so that switch 114 does not place circuit 120 in electrical communication with power source 116 until the switch no longer detects the presence of first and/or second cam members 84, 88. In this manner, circuit 120 does not consume energy from power source 116 until the open or jam condition occurs.

In another embodiment, switch 114 can further detect whether lid 16 is in the closed position. In this manner, warning system 110 can alert a user to a condition where lid 16 has returned to the closed position, but bucket portions 38, 40 remain in an open or partially open state so that first pinch closure 54 is not formed. Here, indicator device 112 will only be activated when the lid is closed and first pinch closure 54 is not formed.

Figure 18A:
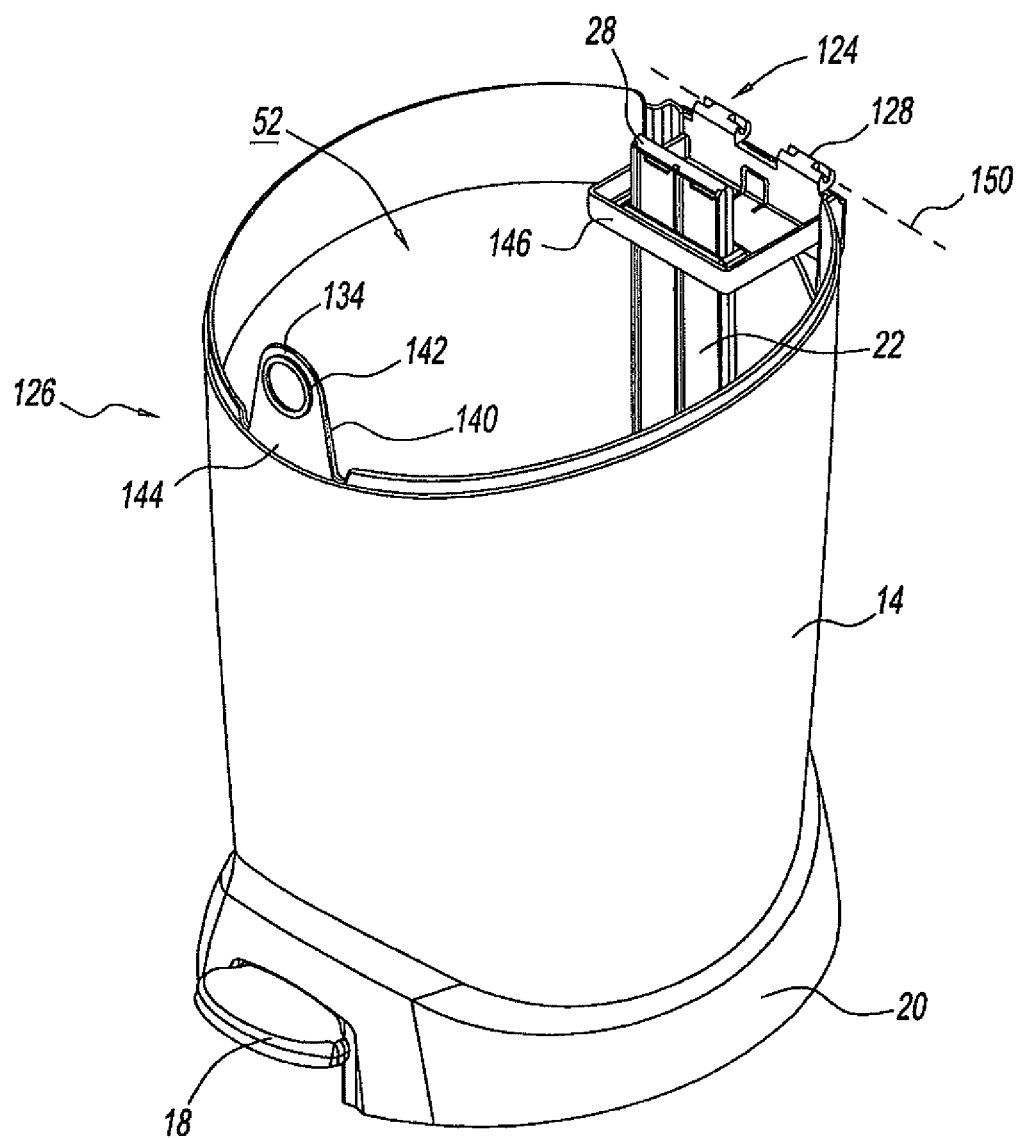
FIG. 18A is a top, front perspective view of an exemplary embodiment of lower housing according to the present disclosure.
Figure 18B:
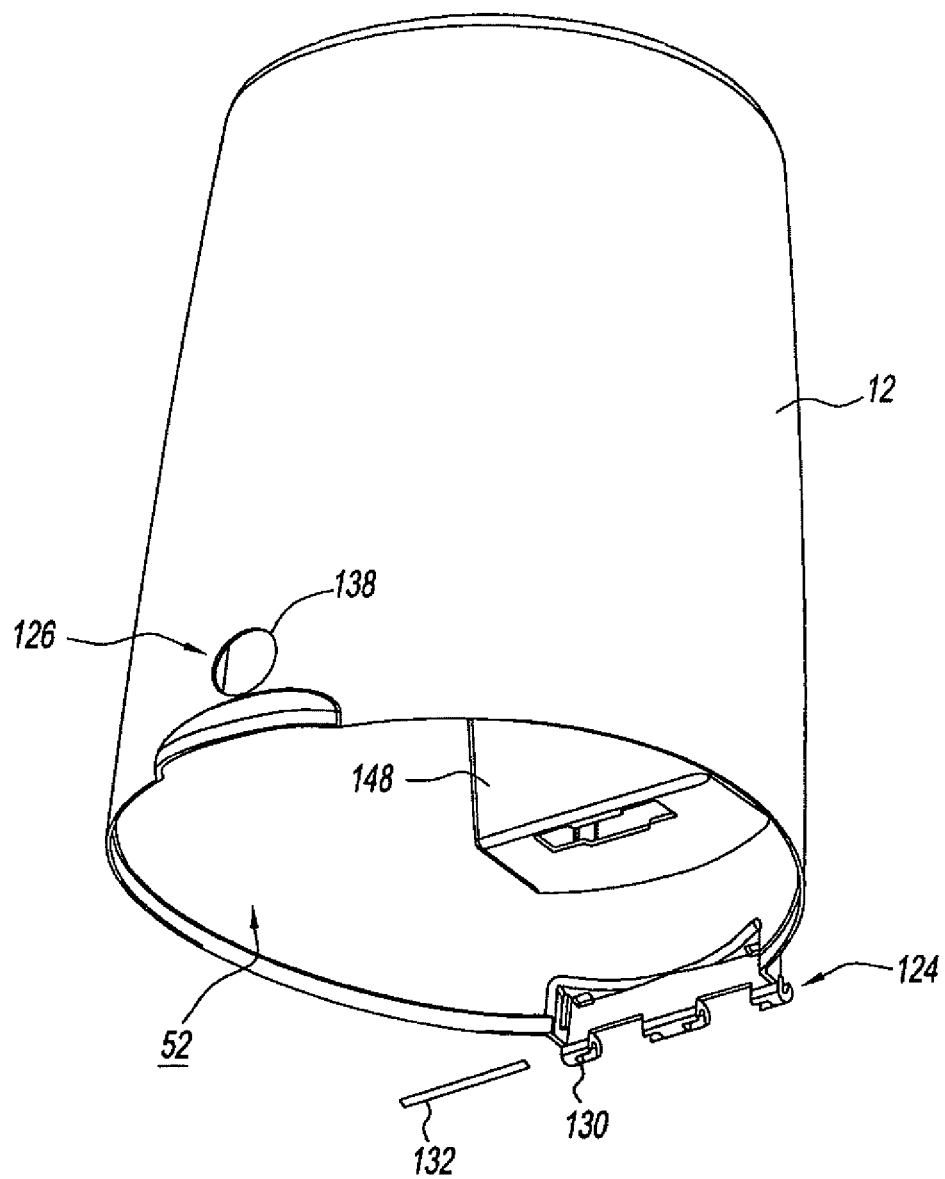
FIG. 18B is a bottom, front perspective view of an exemplary embodiment of lower housing according to the present disclosure.

Referring to FIGS. 1, 18A and 18B, waste disposal device 10 includes a hinge 124 and a locking device 126. Hinge 124 secures lower housing 14 to upper housing 12 allowing the upper housing to be pivoted away from the lower housing so that waste 50 collected within inner storage area 52 can be easily removed. Locking device 126 releasably secures lower housing 14 to upper housing 12 so that waste disposal device 10 remains in a closed state until the user disengages the locking device.

Hinge 124 includes a lower hinge member 128 disposed on lower housing 14 and an upper hinge member 130 disposed on upper housing 12. Lower and upper hinge members 128, 130 are rotatably secured to one another in a known manner by a hinge pin 132.

Locking device 126 includes a first locking member 134 on lower housing 14 and a second locking member 136 on upper housing 12. In the illustrated embodiment, second locking member 136 is illustrated as an opening 138, while first locking member 134 is illustrated as a tab 140 having a rim 142 defined thereon. Tab 140 includes a flexible region 144, which acts as a cantilever beam, so that the tab can flex radially inward until rim 142 is received in opening 138 at which time the resiliency of region 144 biases the rim radially outward into the opening. During the opening of upper housing 12 from lower housing 14, the user merely applies pressure to tab 140 to flex region 144 radially inward until rim 144 is free from opening 138, thus allowing upper housing 12 to be rotated about hinge 124.

Figure 19:
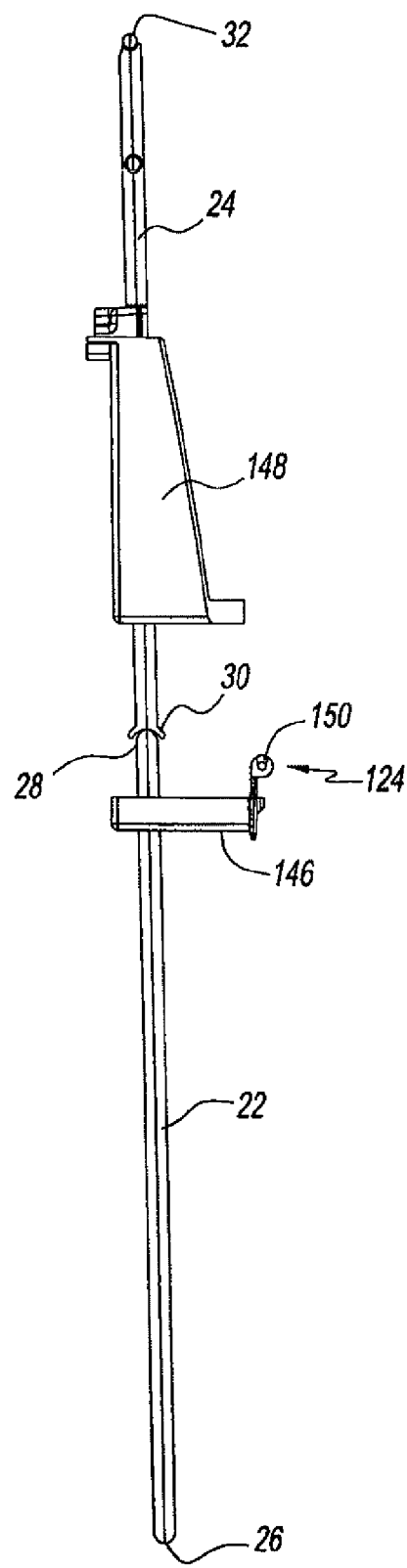
FIG. 19 is a side view of the relationship between a hinge assembly and a push rod of FIG. 18.

Advantageously, waste disposal device 10 is configured to mitigate regions from which odor can emanate by maintaining lower and upper push rods 22, 24 internal to storage area 52, namely within upper and lower housings 12, 14 as shown in FIG. 19.

In order to maintain lower and upper push rods 22, 24 aligned with one another after opening waste disposal device 10 at hinge 124, the device can include a first guide 146 for lower push rod 22 and a second guide 148 for upper push rod 24. First and second guides 146, 148 slideably receive lower and upper push rods 22, 24, respectively therethrough and assist in maintaining the upper end 28 of the lower push rod aligned with the lower end 30 of upper push rod.

In some embodiments, hinge 124 and first guide 146 for lower push rod 22 are integrally formed with one another as shown in FIG. 19. This integral unit locks to lower housing 14 at its upper end so that hinge member 128 extends outside of the lower housing.

Second guide 146 can be secured to bucket frame 36 in any desired manner. For example, second guide 146 can be integral with bucket frame 36 or can be secured to the bucket frame by connectors such as, but not limited to screws or bolts.

Hinge 124 includes an axis of rotation 150 that is external to device 10, while the operative association of upper end 28 of lower push rod 22 with lower end 30 of upper push rod 24 is internal to device. Thus, axis of rotation 150 is offset horizontally with respect to the interaction of ends 28, 30.

Figure 20:
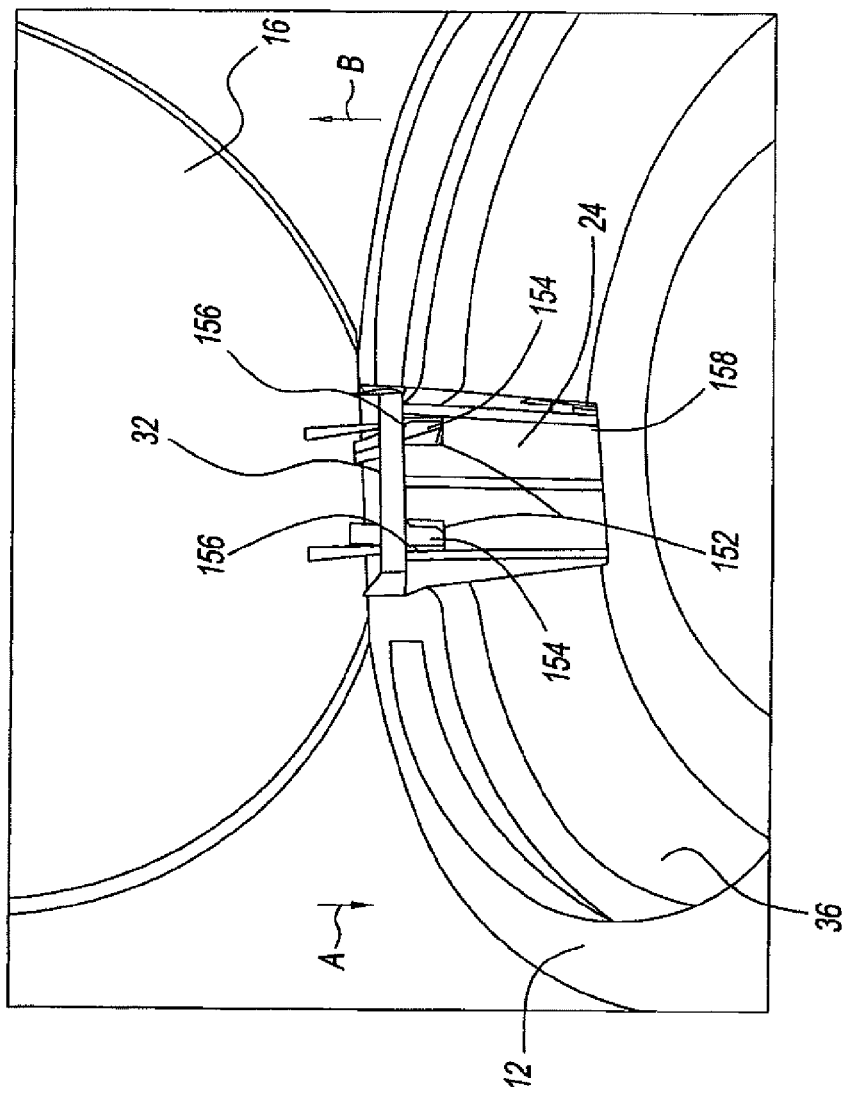
FIG. 20 is a top perspective view of a lid retaining mechanism according to the present disclosure.

Referring now to FIG. 20, an exemplary embodiment of an operative association between upper end 32 of upper push rod 24 and lid 16 is shown. Upper end 32 includes one or more openings 152, while lid 16 includes a corresponding number of projections 154 each having a cam surface 156. As upper push rod 24 moves in the upward direction (B), upper end 32 acts on cam surface 156 so as to open lid 16. As lid 16 moves to the open position, projections 154 are received in openings 152. Advantageously, the interaction of projections 154 and openings 152 maintains upper push rod 24 in operative engagement with lid 16. Further, the interaction of projections 154 and openings 152 prevents lid 16 from opening past a predetermined point.

It is also contemplated by the present disclosure for bucket frame 36 to include an integral guide 158 (FIG. 15) for upper push rod 24. Guide 158 slideably receives upper push rod 24 therethrough and assists in maintaining the upper end 32 of the upper push rod in alignment with projections 154 and surfaces 156 of lid 16.

Once inner storage area 52 is full, the user is required to open waste disposal device 10 and remove the portion of liner material 44 having waste 50 collected therein. The user opens waste disposal device 10 by operating locking device 126 and rotating upper housing 14 about hinge 124. As the user rotates upper housing 14 about hinge 124, additional liner material 44 is withdrawn from cassette.

Figure 21:
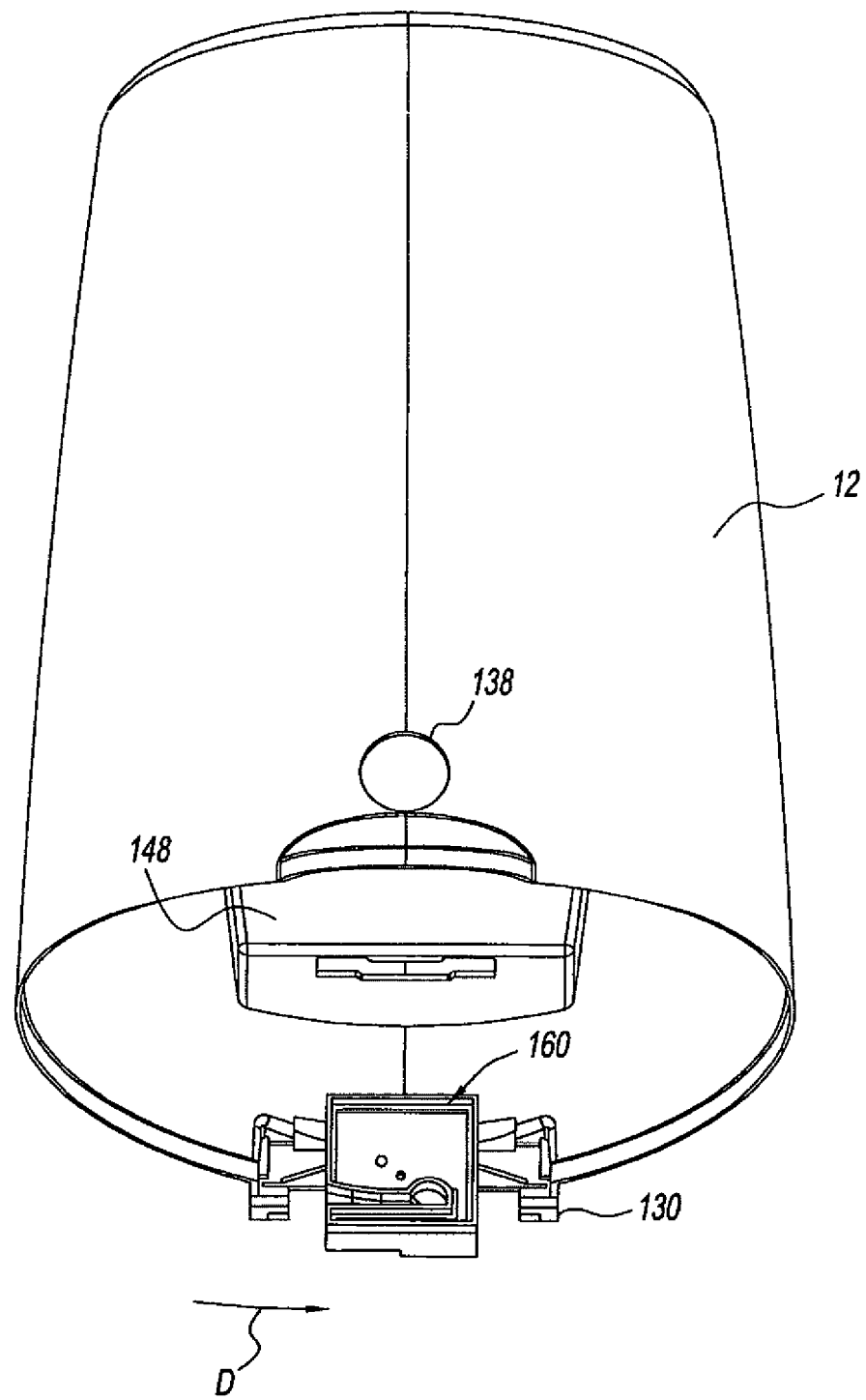
FIG. 21 is a bottom, front perspective view of a cutter assembly according to the present disclosure.
Figure 22:
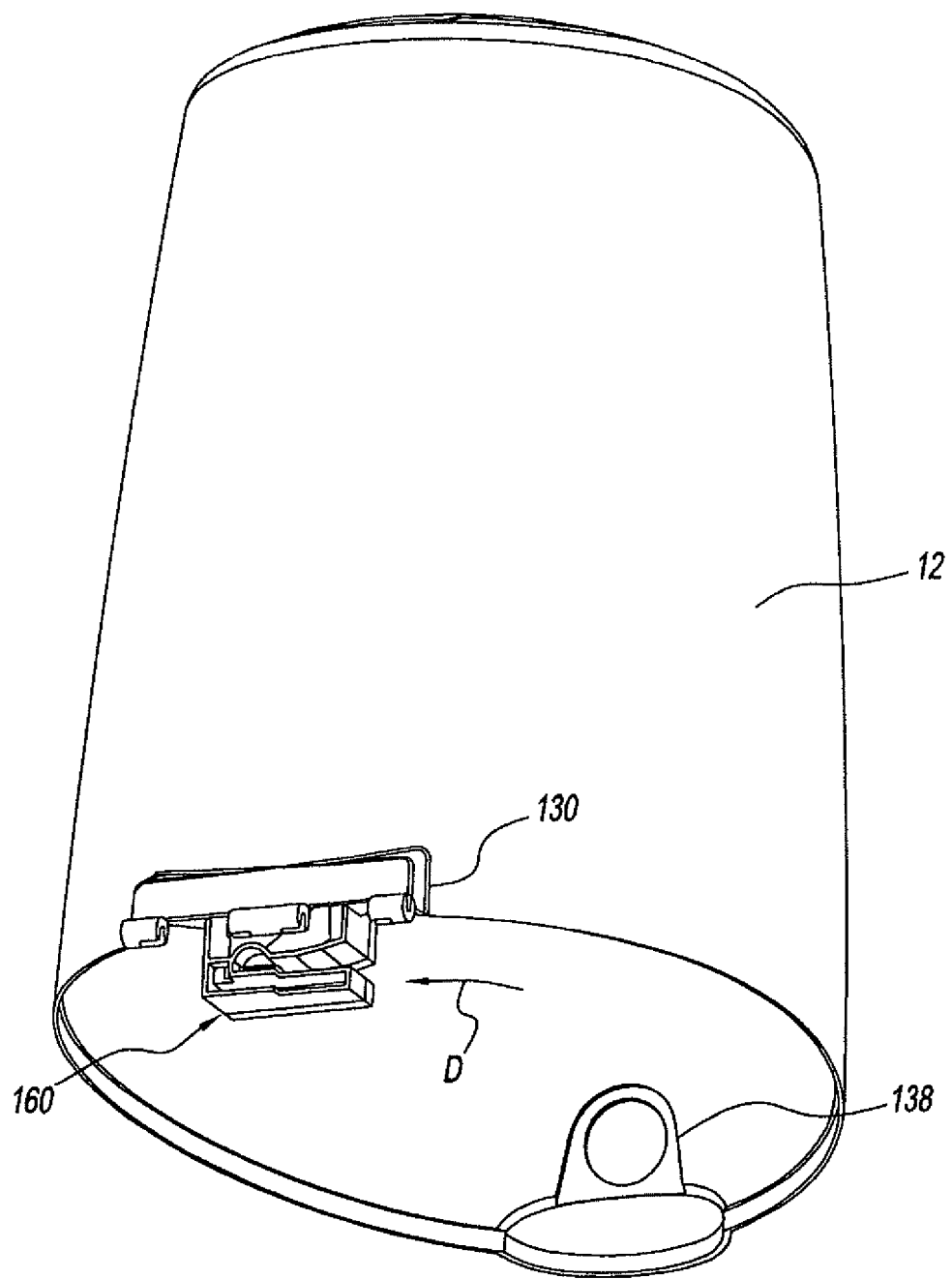
FIG. 22 is a bottom, rear perspective view of the cutter assembly of FIG. 21.
Figure 23:
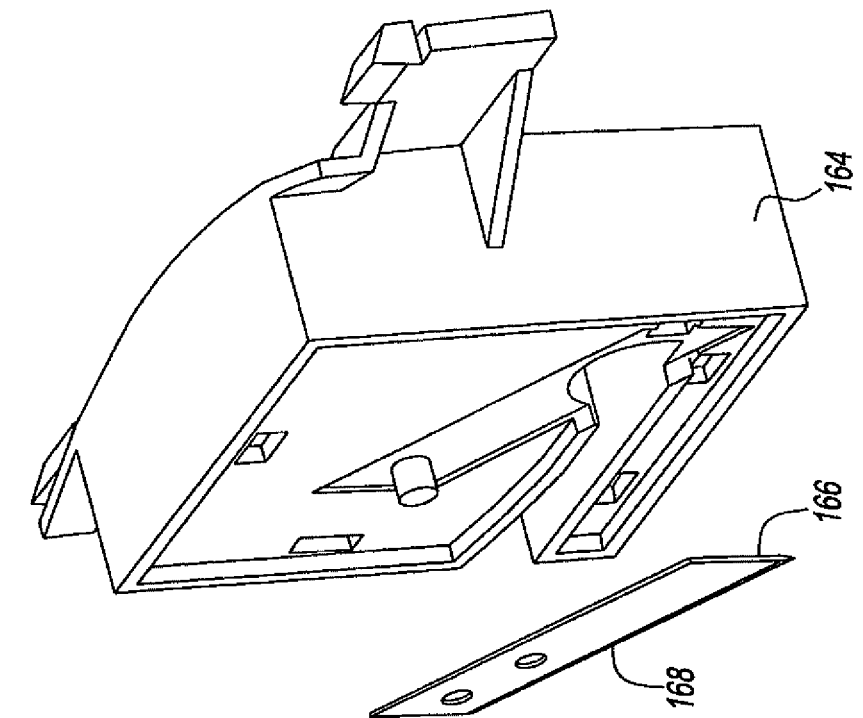
FIG. 23 is an exploded view of the cutter assembly of FIG. 21.
Figure 23:
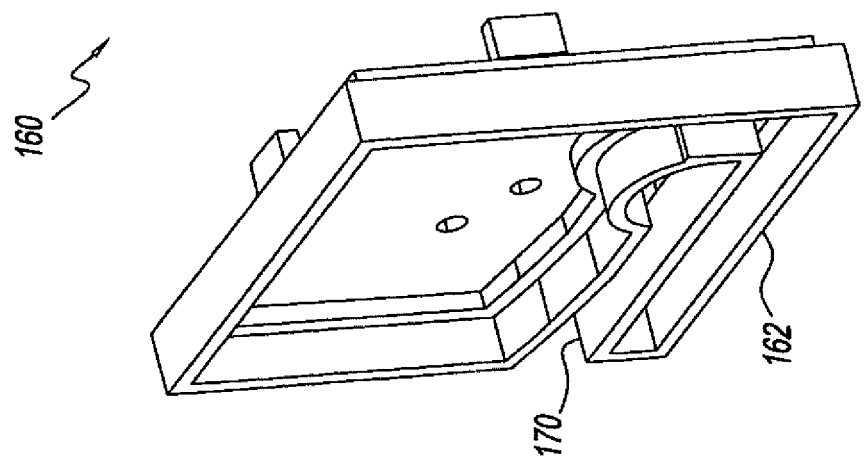

In order to separate the portion of liner material 44 having waste 50 collected therein from the remaining portion of the liner material 44, waste disposal device 10 may include a Cutter assembly 160 shown in FIGS. 21-23. Advantageously, when present, cutter assembly 160 is secured to upper housing 14 at upper hinge member 130, so that the cutter assembly swings with the upper housing up to allow the user easy access to the cutter assembly.

Cutter assembly 160 includes a front member 162, a rear member 164, and a blade 166 having a cutting edge 168. Front and rear members 162, 164 include a line opening 170. Blade 166 is secured between front and rear members 162, 164 so that edge 168 of blade is protected or shielded by the front and rear members, but is exposed at opening 170. In use, the user can slide liner material 44 into opening 170 in a cutting direction (D) so that the liner material is cut by blade edge 168.

After liner material 44 has been cut, the open end of the liner material containing waste 50 can be closed using a knot and can be discarded. In addition, the open end of the portion of liner material 44 remaining in device 10 can be closed with, for example, knot 46, as previously described.

In some embodiments of the present disclosure one or more components of waste disposal device 10 can include an antimicrobial additive incorporated directly into the material of the component. For example, various components of waste disposal device 10 can be formed from a polymer or plastic material having an antimicrobial additive incorporated directly into the polymer or plastic material. Suitable antimicrobials for use in the present disclosure include, but are not limited to, those sold under the tradename Microban® and those sold under the tradename Ultra-Fresh®.

It is also known that many heavy metals such as, but not limited to, copper (Cu) and silver (Ag), can have antimicrobial effects. More particularly, and without wishing to be bound to any particular theory, it is believed that salts of such heavy metals have antimicrobial effects. By way of example, Ultra-Fresh® SA-18 is a sliver refractory antimicrobial that is useful in the present disclosure.

In some embodiments, the components of device 10 can be made of polypropylene, acrylonitrile butadiene styrene (ABS) material, or any combinations thereof. Thus, it is contemplated by the present disclosure for any plastic or polymer component of device 10 such as, but not limited to, upper housings 14, lower housing 12, lid 16, foot pedal 18, shroud 20, push rods 22, 24, bucket assembly 34, cassette 42, liner material 44, pressure sensitive adhesive system 56, or any combinations thereof, to include one or more antimicrobials mixed directly into the plastic or polymer. In one embodiment, one or more antimicrobials having metal particles are mixed directly into the plastic or polymer so that at least a portion of the metal particles protrude from the plastic or polymer.

It is also contemplated by the present disclosure for any component of device 10 to include an antimicrobial additive incorporated directly onto the surface of the component.

In this manner, waste disposal device 10 can inhibit microbial growth on the internal and external surfaces of any component including the antimicrobial additive, which further reduces or mitigates the odors emanating from the device.

It should be recognized that the present disclosure illustrates waste disposal device 10 having merely an exemplary embodiment of bucket assembly 34, where first and second pinch closures 54, 64 are formed by first and second bucket portions 38, 40. Of course, it is contemplated by the present disclosure for waste disposal device 10 to include any bucket assembly 34 configured to form first pinch closure 54 when lid 16 is in the closed position and second pinch closure 64 when the lid 16 is in the open position, all as a result of the simple movement of foot pedal 18.

For example, alternate exemplary embodiments of bucket assemblies for use with waste disposal device 10 are shown in FIGS. 24-43.

Referring to FIGS. 24-27, an alternate exemplary embodiment of a bucket assembly according to the present disclosure is shown and generally referred to by reference numeral 234. For purposes of clarity, various elements of waste disposal device 10 have been omitted. Rather, bucket assembly 234 is shown in relation only to cassette 42 and upper push rod 24.

Figure 24:
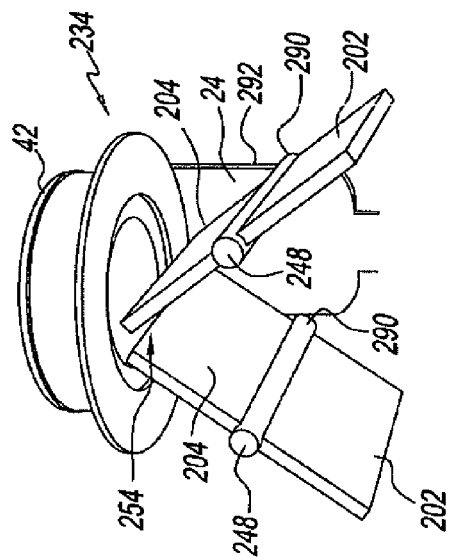
FIG. 24 is a perspective view of a second exemplary embodiment of a bucket assembly according to the present disclosure shown in the open or use position.
Figure 26:
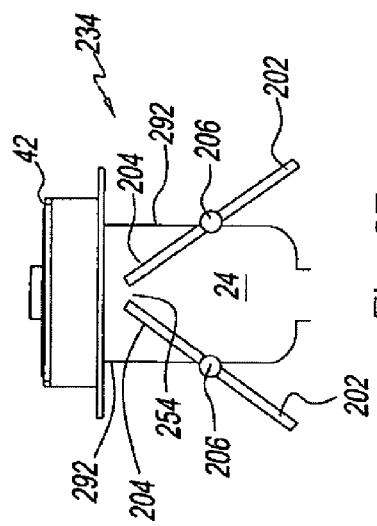
FIG. 26 is a perspective view of the bucket assembly of FIG. 24 shown in the closed or non-use position.
Figure 25:
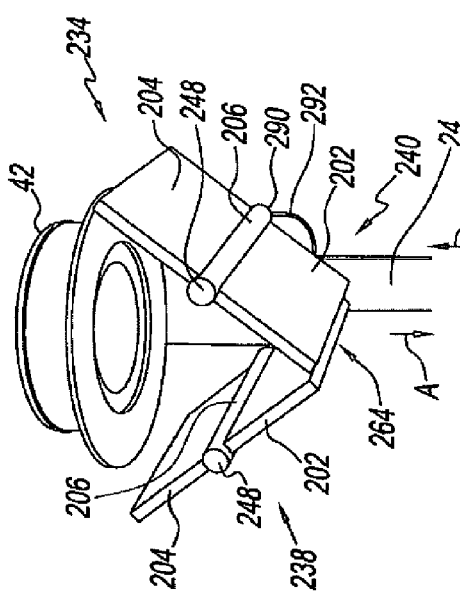
FIG. 25 is a front view of the bucket assembly of FIG. 24.
Figure 27:
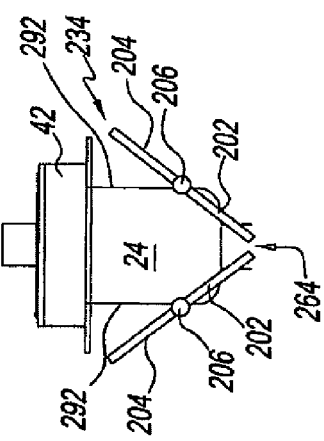
FIG. 27 is a front view of the bucket assembly of FIG. 26.

Bucket assembly, 234 includes a first member 238 and a second member 240. First and second members 238, 240 are secured to the bucket frame (not shown) for rotation between a closed or non-use position (FIGS. 26-27) and an open or use position (FIGS. 24-25). In the closed position, first and second members 238, 240 form a first pinch closure 254, while in the open position the first and second members form a second pinch closure 264.

Bucket assembly 234 includes one or more biasing members 248 biasing first and second members 238, 240 to the closed position. In an exemplary embodiment biasing members 248 include torsion springs.

First and second members 238, 240 each include an extended portion 290 that is in operative engagement with a surface 292 of upper push rod 24.

In some embodiments, the operative engagement between extended portion 290 and surface 292 is a rack-and-pinion arrangement that rotates first and second members 238, 240 upon movement of upper push rod 24 in the downward and upward directions (A, B) respectively. In other embodiments, the operative engagement between extended portion 290 and surface 292 can be a friction arrangement that rotates first and second members 238, 240 upon movement of upper push rod 24.

First and second members 238, 240 can, in some embodiments, each be formed of a lower section 202 and an upper section 204 that are secured to one another by a hinge 206. In normal use, lower section 202 and upper section 204 are maintained by biasing members 248 in a generally parallel relationship to one another so that first and second bucket portions 238, 240 define a generally linear shaped member. However, and in the event of a jam or other condition within device 10 when first and second bucket portions 238, 240 are in the open or use position of FIG. 24, a user can push on the lower section 202 so as to overcome the biasing or spring force of biasing members 248. Overcoming the biasing or spring force of biasing members 248 causes lower section 202 to rotate with respect to upper section 204 about hinge 206.

It should be recognized that biasing members 248 have been described as biasing first and second members 238, 240 to the closed position and biasing lower and upper sections 202, 204 to their normal liner shape. Of course, it is contemplated for these biasing functions to be achieved by separate biasing members 248. In addition, it is contemplated for lower and upper sections 202, 204 to be integrally formed with hinge 206 so that the hinge is merely an elastically deformable portion of first and second members 238, 240, respectively.

Referring to FIGS. 28-31, another alternate exemplary embodiment of a bucket assembly according to the present disclosure is shown and generally referred to by reference numeral 334. Again, various elements of waste disposal device 10 have been omitted for purposes of clarity. Rather, bucket assembly 334 is shown in relation only to cassette 42 and upper push rod 24.

Figure 28:
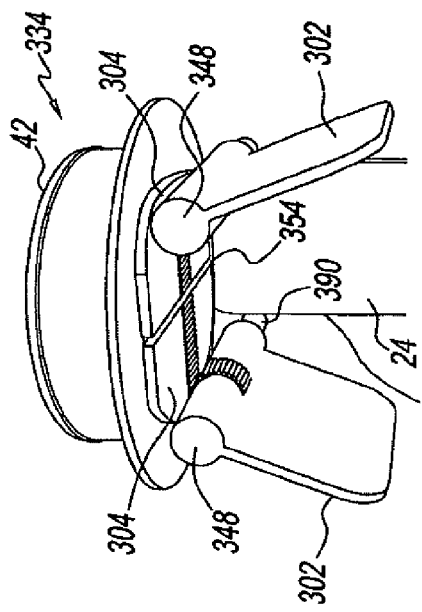
FIG. 28 is a perspective view of a third exemplary embodiment of a bucket assembly according to the present disclosure shown in the open or use position.
Figure 30:
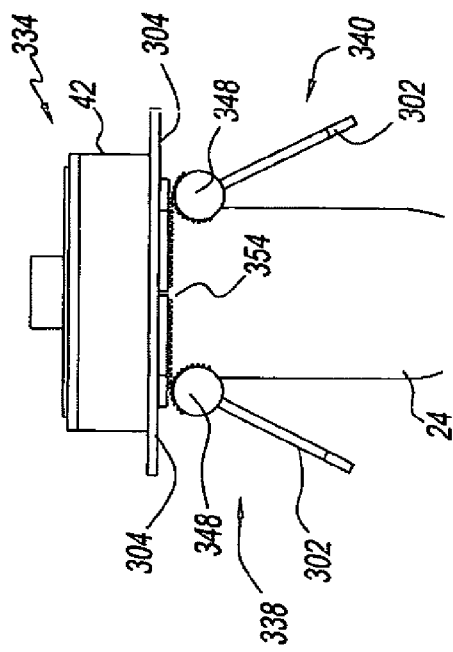
FIG. 30 is a perspective view of the bucket assembly of FIG. 28 shown in the closed or non-use position.
Figure 29:
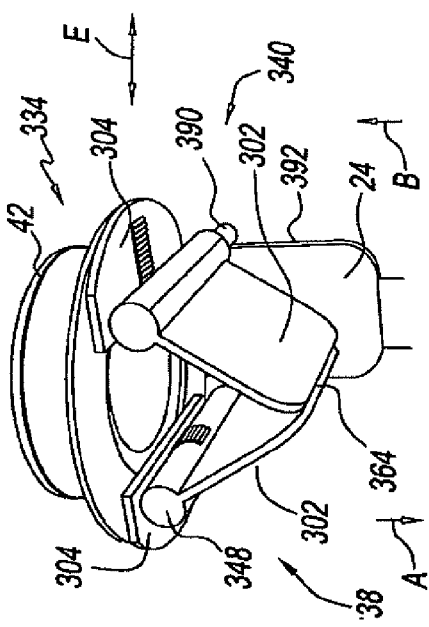
FIG. 29 is a front view of the bucket assembly of FIG. 28.
Figure 31:
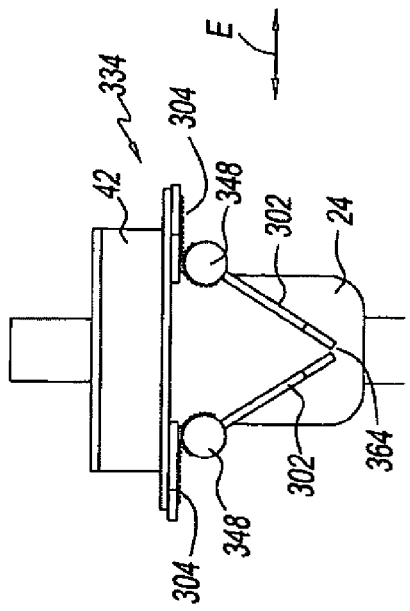
FIG. 31 is a front view of the bucket assembly of FIG. 30.
Figure 39:
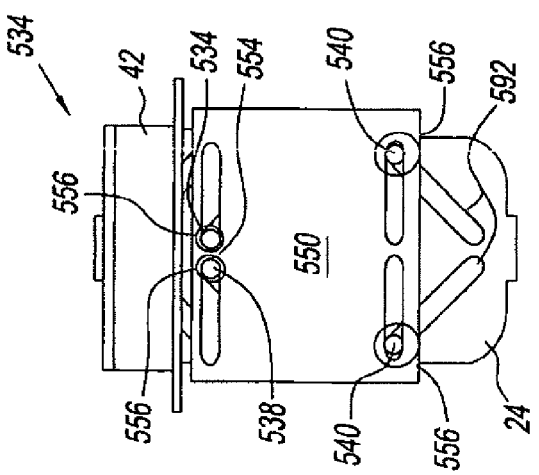
FIG. 39 is a front view of the bucket assembly of FIG. 38.

Bucket assembly 334 includes a first member 338 and a second member 340. First and second members 338, 340 are secured to the bucket frame (not shown) for movement between a closed or non-use position (FIGS. 30-31) and an open or use position (FIGS. 28-29). In the closed position, first and second members 338, 340 form a first pinch closure 354, while in the open position the first and second members form a second pinch closure 364.

First and second members 338, 340 are formed of a lower section 302 and an upper section 304. Lower sections 302 are secured to the bucket frame (not shown) for rotation between the closed and open positions. Upper sections 304 are secured to the bucket frame (not shown) for movement in a radial direction (E) between the closed and open positions.

In addition, lower section 302 and an upper section 304 are operatively engaged with one another so that rotation of the lower section results in the movement of the upper section in the radial direction (E). In some embodiments, the operative engagement between lower section 302 and an upper section 304 is a rack-and-pinion arrangement configured so that rotation of the lower section results in the radial movement of the upper section.

Bucket assembly 334 includes one or more biasing members 348 configured to bias first and second members 338, 340 to the closed position. In an exemplary embodiment biasing members 348 include torsion springs.

First and second members 338, 340 each include an extended portion 390 that is in operative engagement with a surface 392 of upper push rod 24.

In some embodiments, the operative engagement between extended portion 390 and surface 392 is a rack-and-pinion arrangement configured to rotate first and second members 338, 340 upon movement of upper push rod 24 in the downward and upward directions (A, B) respectively. In other embodiments, the operative engagement between extended portion 390 and surface 392 can be a friction arrangement configured to rotate first and second members 338, 340 upon movement of upper push rod 24.

Referring to FIGS. 32-35, yet another alternate exemplary embodiment of a bucket assembly according to the present disclosure is shown and generally referred to by reference numeral 434. Again, various elements of waste disposal device 10 have been omitted for purposes of clarity. Rather, bucket assembly 434 is shown in relation only to cassette 42 and upper push rod 24.

Bucket assembly 434 includes a first member 438 and a second member 440. First and second members 438, 440 are secured to the bucket frame (not shown) for movement between a closed or non-use position (FIGS. 34-35) and an open or use position (FIGS. 32-33). In the closed position, first and second members 438, 440 form a first pinch closure 454, while in the open position the first and second members form a second pinch closure 464.

First and second members 438, 440 include a flexible member 402, a linkage 404, and a shaft 406. Shaft 406 is rotatably secured to the bucket frame (not shown). Linkage 404 operatively connects shaft 406 to flexible member 402. Flexible member 402 resiliently inverts between a concave shape (FIGS. 32-33) and a convex shape (FIGS. 34-35). Advantageously, the resilient nature of flexible member 402 biases first and second members 438, 440 to the closed position.

Shaft 406 includes an extended portion 490 that is in operative engagement with a surface 492 of upper push rod 24. In some embodiments, the operative engagement between extended portion 490 and surface 492 is a rack-and-pinion arrangement that rotates first and second members 438, 440 upon movement of upper push rod 24 in the downward and upward directions (A, B) respectively. In other embodiments, the operative engagement between extended portion 490 and surface 492 can be a friction arrangement that rotates first and second members 438, 440 upon movement of upper push rod 24.

Thus, movement of upper push rod 24 in upward direction B results in rotation of shaft 406. Rotation of shaft 406 results in linkage 404 overcoming the resilient forces of flexible member 402 so that the flexible member inverts to the open position. Release of the foot pedal results in upper push rod 24 moving in the downward direction A as a result of the inherent resiliency of flexible member 402, returning the flexible member to the closed position.

Referring to FIGS. 36-39, a fifth exemplary embodiment of a bucket assembly according to the present disclosure is shown and generally referred to by reference numeral 534. Again, various elements of waste disposal device 10 have been omitted for purposes of clarity. Rather, bucket assembly 534 is shown in relation only to cassette 42 and upper push rod 24.

Figure 37:
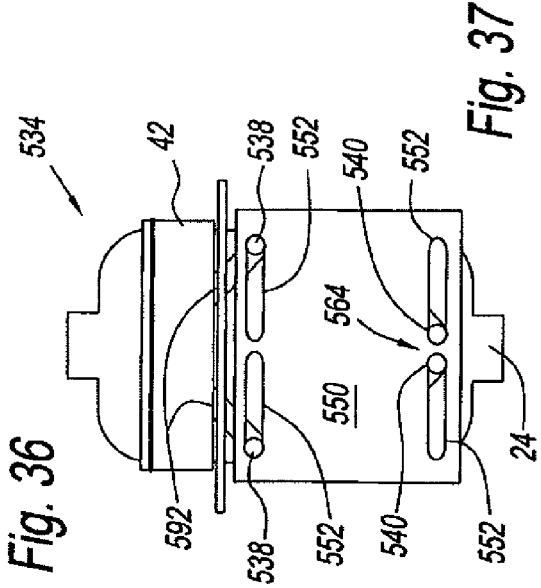
FIG. 37 is a front view of the bucket assembly of FIG. 36.
Figure 36:
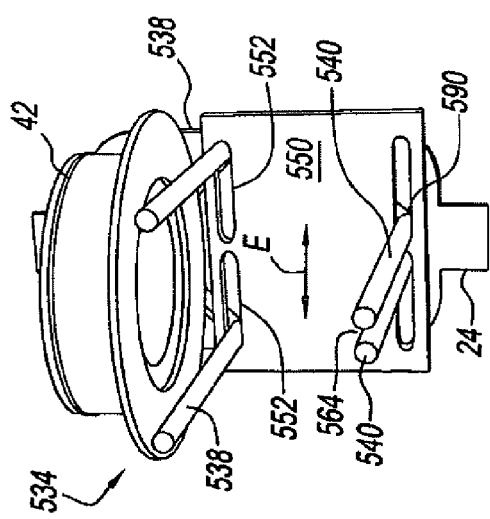
FIG. 36 is a perspective view of a fifth exemplary embodiment of a bucket assembly according to the present disclosure shown in the open or use position.

Bucket assembly 534 includes a pair of first members 538 and a pair of second members 540. First and second members 538, 540 are secured to the bucket frame (not shown) for movement in a radial direction (E) rotation between a closed or non-use position (FIGS. 38-39) and an open or use position (FIGS. 36-37). In the closed position, first members 538 form a first pinch closure 554, while in the open position second members 540 form a second pinch closure 564.

First and second members 538, 540 each include an extended portion 590 that is in operative engagement with a surface 592 of upper push rod 24. In the illustrated embodiment, surfaces 592 are shown as cam slots in which portion 590 extends. In this embodiment, bucket assembly 534 includes a stationary guide plate 550 having guide slots 552 in which portion 590 also extends.

Figure 38:
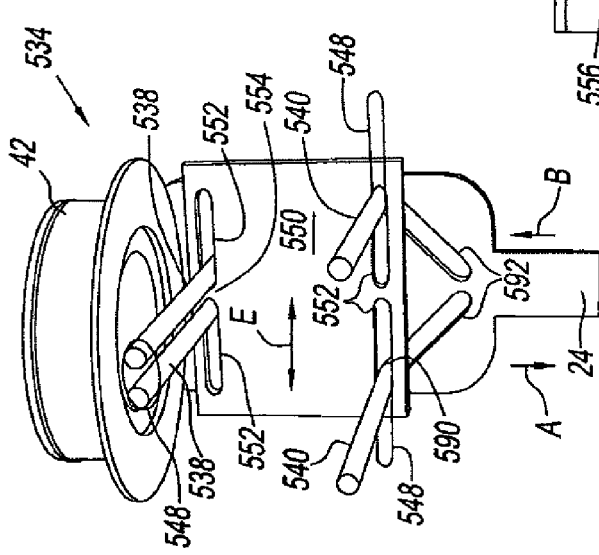
FIG. 38 is a perspective view of the bucket assembly of FIG. 36 shown in the closed or non-use position.

Movement of upper push rod 24 in the downward direction (A) causes, due to the interaction of cam slots 592 and guide slots 552, to urge first and second members 538, 540 to the closed position shown in FIG. 38. Conversely, movement of upper push rod 24 in the upward direction (B) causes, due to the interaction of cam slots 592 and guide slots 552, to urge first and second members 538, 540 to the open position shown in FIG. 36.

Bucket assembly 534 includes one or more biasing members 548 (FIG. 38) biasing first and second members 538, 540 to the closed position. In an exemplary embodiment biasing members 548 are shown as elastic bands. Of course, other biasing members 548 such as, but not limited, to tension springs, compression springs, rotary springs, or any combinations thereof are contemplated by the present disclosure.

Advantageously, cam slots 592 control the opening and closing of first and second members 538, 540 faster than the opening and closing of the lid (not shown) of the waste disposal device. For example, cam slots 592 can be configured so that second pinch closure 564 is formed before lid is completely opened to mitigate emanation of odor from the waste disposal device. In addition, cam slots 592 can be configured so that first pinch closure 554 is formed before lid is completely closed to mitigate emanation of odor from the waste disposal device.

In some embodiments, first and/or second members 538, 540 can include a resilient cover 556 (FIG. 39) disposed thereon to assist in the formation first and second pinch closures 554, 564, respectively. By way of example, resilient covers 556 can include closed cell foam members disposed on first and/or second members 538, 540.

Referring to FIGS. 40-43, another alternate exemplary embodiment of a bucket assembly according to the present disclosure is shown and generally referred to by reference numeral 634. For purposes of clarity, various elements of waste disposal device 10 have been omitted. Bucket assembly 634 includes bucket frame 36, a first bucket member 638, and a second bucket member 640. Bucket frame 36 is discussed in detail above with respect to FIGS. 1-23 and, thus, further discussion of the bucket frame will be omitted hereinbelow.

Figure 42:
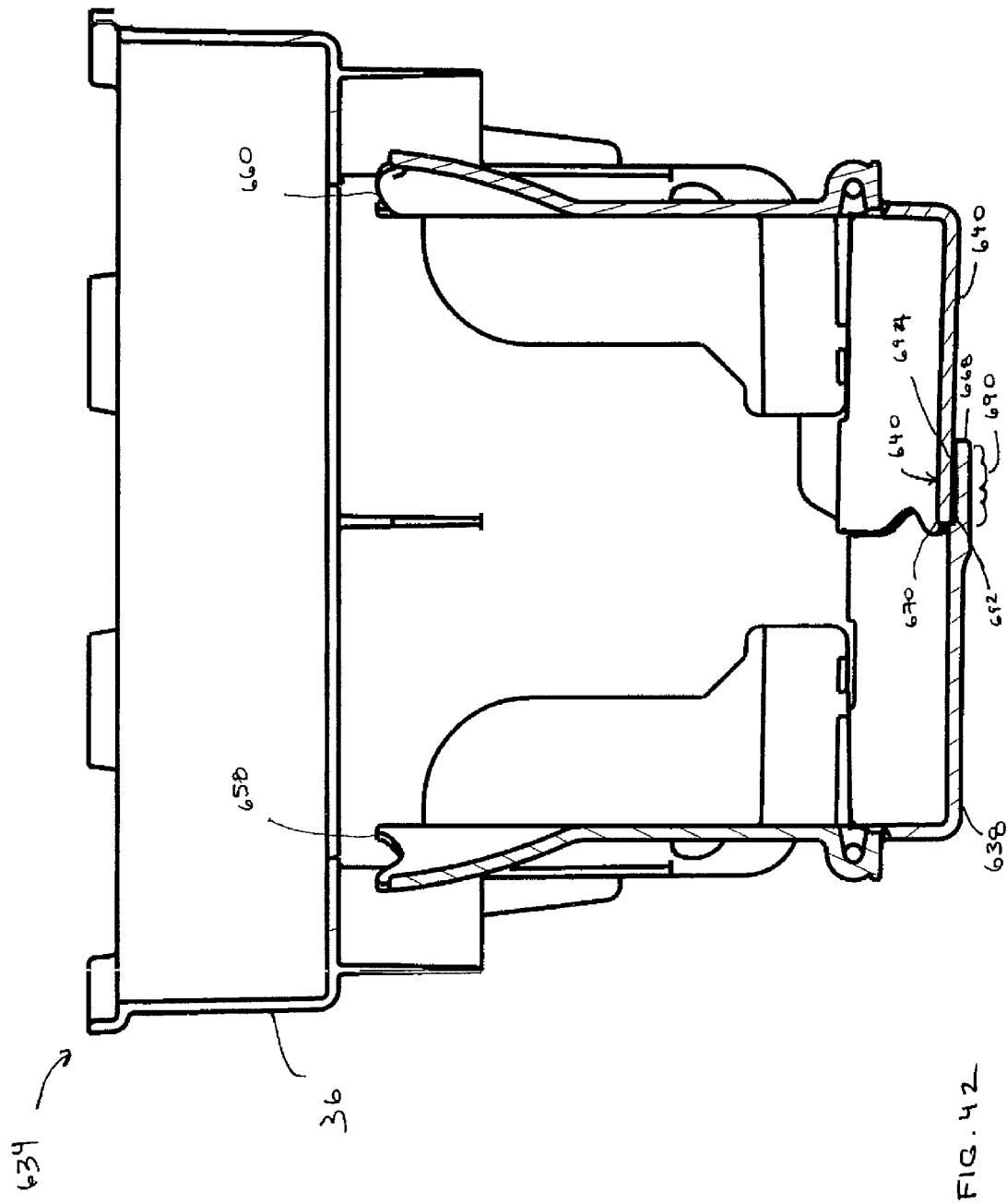
FIG. 42 is a sectional view of the bucket assembly of FIG. 40.
Figure 43:
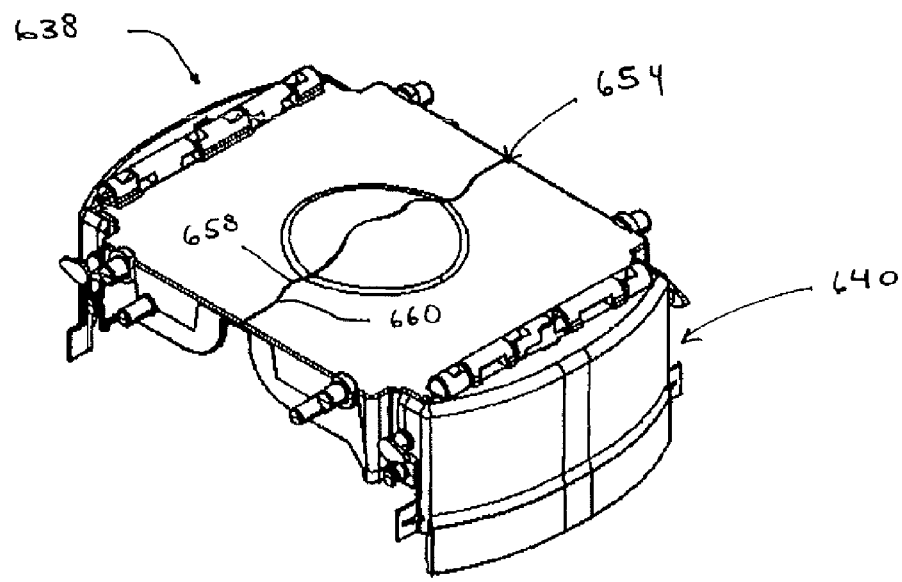
FIG. 43 is a top perspective view of the bucket portions of FIG. 41, illustrated the bucket assembly in a closed or non-use position.

First and second bucket members 638, 640 are secured to the bucket frame 36 for rotation between an open or use position (FIGS. 40-42) and a closed or non-use position (FIG. 43). In the closed position of FIG. 43, first and second members 638, 640 form a first pinch closure 654, while in the open position the first and second members form a second pinch closure 664.

Accordingly, first pinch closure 654 mitigates the emanation of odor from the waste within the inner storage area when the waste disposal device is closed.

First pinch closure 654 is defined by leading edges 658, 660 of first and second bucket portions 638, 640, respectively. Advantageously, leading edges 658, 660 each include a complimentary non-planar shape. In this manner, leading edges 658, 660 define a longer pinch closure then would be otherwise provided with planar leading edges. In the illustrated embodiment, leading edges 658, 660 each include a complimentary wave-like shape. Of course, it is contemplated by the present disclosure for leading edges 658, 660 to each include any complimentary non-planar shape such as, but not limited to, a square wave pattern, a saw tooth pattern, and any combinations thereof.

The pressure of first pinch closure 654 is maintained by the spring force of biasing members 48 (FIG. 11). In some embodiments, device 10 provides first pinch closure 654 with a closing force of between about 0.5 pounds to about 5 pounds, more preferably between about 1.25 pounds to about 2 pounds, and all subranges therebetween. In other embodiments, first pinch closure 654 provides a seal having a surface area of about 0.40 square inches (in$^2$) to about 1.50 in$^2$, more preferably about 0.70 in$^2$, and any subranges therebetween.

Figure 40:
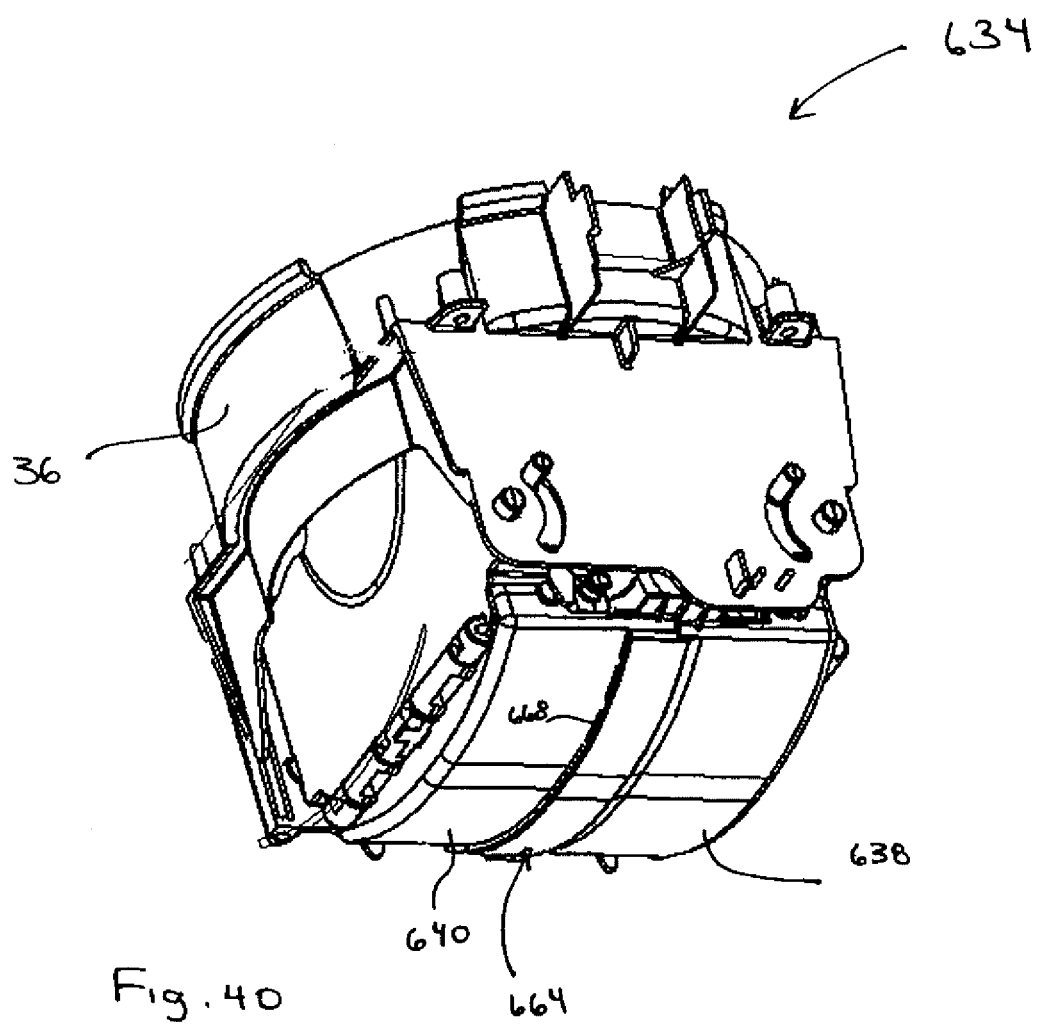
FIG. 40 is a bottom perspective view of a sixth alternate exemplary embodiment of a bucket assembly according to the present disclosure, illustrating the bucket assembly in a fully open or use position.
Figure 41:
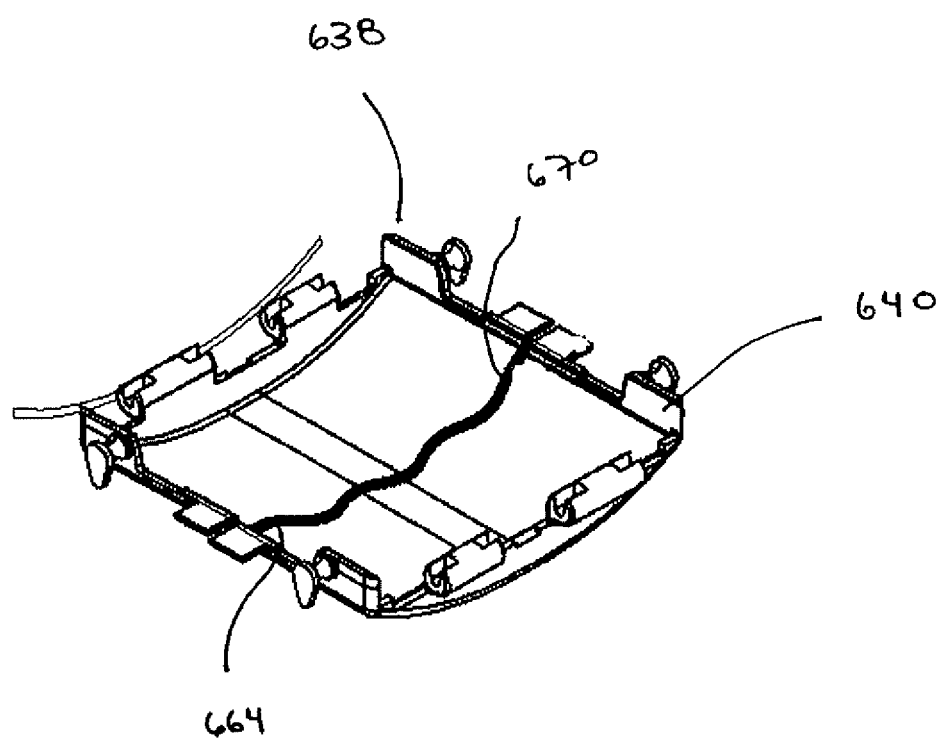
FIG. 41 is a top perspective view of bucket portions of the bucket assembly of FIG. 40.

Second pinch closure 664 mitigates the emanation of odor from the waste within the inner storage area when the waste disposal device is opened during use. In the open position, the waste is maintained within the liner material between the knot and the second pinch closure 664. Second pinch closure 664 is defined by trailing edges 668, 670 of first and second bucket portions 638, 640, respectively as shown in FIGS. 40-42.

Advantageously, second pinch closure 664 is formed by an overlapped area 690 of trailing edges 668, 670. More particularly, first bucket portion 638 includes a recessed area 692, which is configured to receive a portion 694 of second bucket portion 640.

It has been determined by the present disclosure that second pinch closure 664 formed by overlapped area 690 further increases the surface area of the second pinch closure to mitigate the emanation of odor from the waste within the inner storage area.

In some embodiments, second pinch closure 660 is further defined by trailing edges 668, 670 of first and second bucket portions 638, 640, respectively. Advantageously, trailing edges 668, 670 each include a complimentary non-planar shape. In this manner, trailing edges 668, 670 define a longer pinch closure then would be otherwise provided with planar trailing edges. In the illustrated embodiment, trailing edges 668, 670 each include a complimentary wave-like shape. Of course, it is contemplated by the present disclosure for trailing edges 668, 670 to each include any complimentary non-planar shape such as, but not limited to, a square wave pattern, a saw tooth pattern, and any combinations thereof.

The pressure of second pinch closure 664 is defined by the pressure applied by the user on foot pedal 18 as discussed above.

Second pinch closure 664 having both overlapped area 690 and complimentary non-planar trailing edges 668, 670 provides a seal having a surface area of about 2.50 in$^2$ to about 3.00 in$^2$, more preferably about 2.90 in$^2$, and any subranges therebetween.

Figure 44:
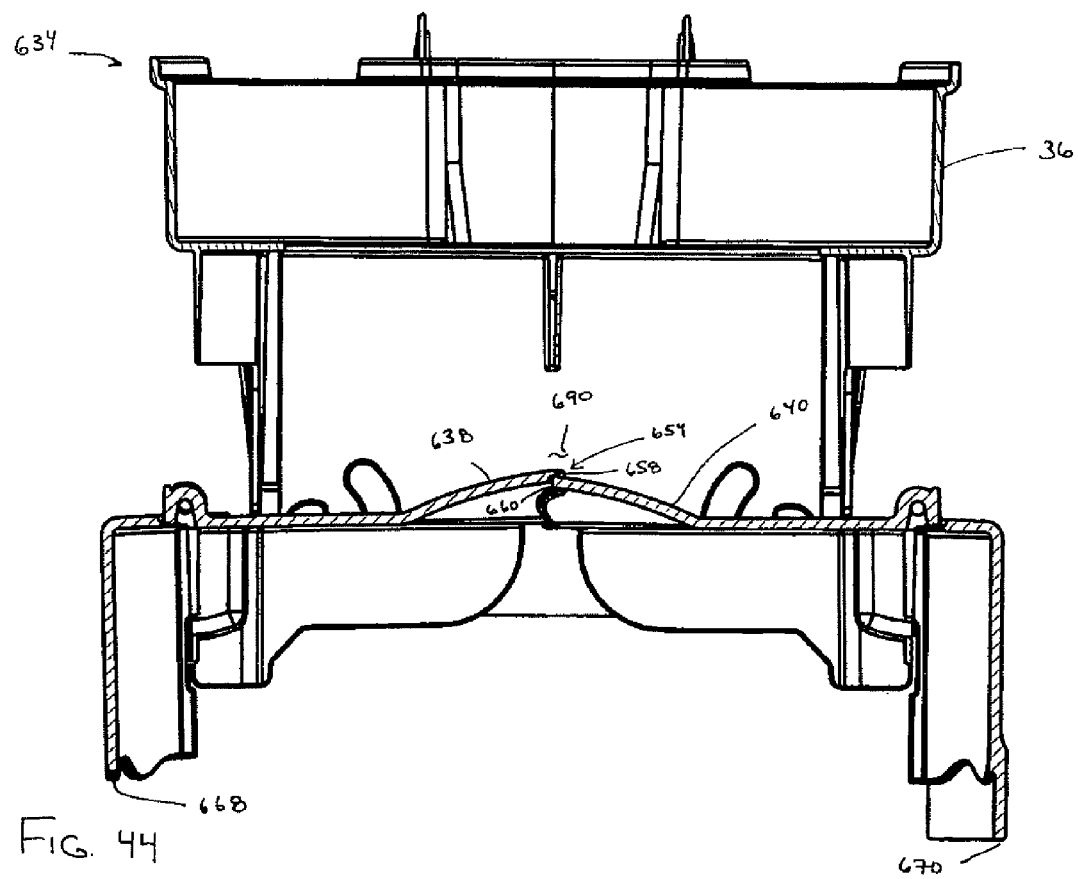
FIG. 44 is a sectional view of an alternate embodiment of the bucket assembly of FIG. 40 in the closed or non-use position.

It should be recognized that first pinch closure 654 was described herein by way of example having complimentary non-planar leading edges 658, 660. However, it is also contemplated by the present disclosure for first pinch closure 654 to further include overlapped area 690 as shown in FIG. 44. Further, it is contemplated by the present disclosure for overlapped area 690 to be omitted from second pinch closure 664 so that the second pinch closure 664 only includes complimentary non-planar trailing edges 668, 670.

It should also be noted that the terms "first", "second", "third", "upper", "lower", and the like may be used herein to modify various elements. These modifiers do not imply a spatial, sequential, or hierarchical order to the modified elements unless specifically stated. While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:
1. A waste disposal device, comprising:
 a housing having an opening to allow access to an inner storage area;
 a lid pivotally secured to said housing at said opening;
 a bucket frame positioned at said opening;

a pair of members pivotally secured to said bucket frame, each of said pair of members having a leading edge and a trailing edge; and a foot pedal pivotally secured to said housing, said foot pedal being operatively associated with said lid and said pair of members, said waste disposal device having a non-use position wherein said foot pedal has an upper position such that said lid is in a closed position and said leading edges of said pair of members form a first pinch closure, said waste disposal device having a use position wherein said foot pedal has a lower position such that said lid is in an open position and said trailing edges of said pair of members form a second pinch closure, said waste disposal device having a pinch seal in said non-use position and said use position to reduce odor emanating from said pail.

2. The waste disposal device of claim 1, further comprising a liner material for collecting and receiving waste having an open end and a closed end.

3. The waste disposal device of claim 1, further comprising a bucket assembly, comprising:
the bucket frame, comprising:
a pair of first pivot openings;
a pair of second pivot openings;
a pair of first cam slots; and
a pair of second cam slots;
a first bucket portion, comprising:
a pair of first pivot members; and
a pair of first cam members,
wherein said first bucket portion is received in said bucket frame so that said first pivot members are pivotally received in said first pivot openings and said first cam members are received in said first cam slots; and
a second bucket portion, comprising:
a pair of second pivot members; and
a pair of second cam members,
wherein said second bucket portion rotates in said bucket frame so that said second pivot members are pivotally received in said second pivot openings and said second cam members are received in said second cam slots.

4. The waste disposal device of claim 3, further comprising a push rod having a surface that engages an extension member such that movement of said push rod in an upward direction causes said surface to push said extended portion in an upward direction so that said first and said second cam members travel along said first and said second cam slots and said first and said second bucket portions rotates about said first and said second pivot members, respectively.

5. The bucket assembly of claim 4, further comprising one or more biasing members for each of said first bucket portion and said second bucket portion, wherein said one or more biasing members are configured to return said first bucket portion and said second bucket portion from an open position to a closed position.

6. The bucket assembly of claim 5, further comprising one or more retainers that are configured to secure an upper end of said one or more biasing members to said bucket frame.

7. The bucket assembly of claim 5, further comprising one or more retainers that are configured to secure a lower end of said one or more biasing members to said first bucket portion and said second bucket portion.

8. A bucket assembly for a waste disposal device, comprising:
a bucket frame, comprising:
a pair of first pivot openings;
a pair of second pivot openings;
a pair of first cam slots; and
a pair of second cam slots;
a first bucket portion, comprising:
a pair of first pivot members; and
a pair of first cam members,
wherein said first bucket portion is received in said bucket frame so that said first pivot members are pivotally received in said first pivot openings and said first cam members are received in said first cam slots; and
a second bucket portion, comprising:
a pair of second pivot members; and
a pair of second cam members,
wherein said second bucket portion rotates in said bucket frame so that said second pivot members are pivotally received in said second pivot openings and said second cam members are received in said second cam slots.

9. The bucket assembly of claim 8, further comprising one or more biasing members for each of said first bucket portion and said second bucket portion, wherein said one or more biasing members are configured to return said first bucket portion and said second bucket portion from an open position to a closed position.

10. The bucket assembly of claim 9, further comprising one or more retainers that are configured to secure an upper end of said one or more biasing members to said bucket frame.

11. The bucket assembly of claim 9, further comprising one or more retainers that are configured to secure a lower end of said one or more biasing members to said first bucket portion and said second bucket portion.

* * * * *